United States Patent

O'Reilly et al.

Patent Number: 5,825,769
Date of Patent: Oct. 20, 1998

[54] SYSTEM AND METHOD THEREFOR OF VIEWING IN REAL TIME CALL TRAFFIC OF A TELECOMMUNICATIONS NETWORK

[75] Inventors: Dan O'Reilly; Matthew J. Brazier, both of Colorado Springs, Colo.

[73] Assignee: MCI Corporation, Washington, D.C.

[21] Appl. No.: 587,381

[22] Filed: Jan. 17, 1996

Related U.S. Application Data

[63] Continuation-in-part of Ser. No. 405,988, Mar. 17, 1995, Pat. No. 5,610,915.

[51] Int. Cl.⁶ .......................................................... H04J 3/02

[52] U.S. Cl. .............................................. 370/360; 379/96

[58] Field of Search ................................ 370/58.1, 110.1, 370/68.1, 58.3, 60, 94.1, 360, 359, 377, 378, 384, 387, 388, 389, 398, 400, 241, 244, 252, 253; 379/220, 209, 94–96, 387, 64, 204, 201

[56] References Cited

U.S. PATENT DOCUMENTS

| | | | |
|---|---|---|---|
| 4,160,129 | 7/1979 | Peyser et al. | 379/220 |
| 5,228,076 | 7/1993 | Hopner et al. | 379/60 |

Primary Examiner—Dang Ton

[57] ABSTRACT

In a telecommunications network, to provide both statistical reporting functions and reporting on a call by call detail basis, a "TRAFFICVIEW" Server (TVS) system is incorporated with a MCI Traffic Statistics (MTS) system. The TVS is responsive to instructions provided by subscribers so that reports may be provided on a given time period, at a given frequency and in a particular format, as instructed by the subscribers. Standard reports are delivered via E-Mail, fax or hard copy. A subscriber may obtain a static view of the traffic for a special service call number by communicating with the TVS. Moreover, a remote subscriber may download from the TVS a data file which contains raw call details and statistics that he can import to his own reports. Alternatively, a remote subscriber may link up with a real time statistics (RTS) system so that he can monitor the operation of the network, as it relates to calls directed to the subscriber's special service call numbers, in real time. Different types of call detail reports may be generated from the TVS.

25 Claims, 17 Drawing Sheets

```
31-Aug-1994          MCI 800 Trafficview        Profile Selection

┌─Profile──────┬─Description─────────────────────────┐
        │ CHRIS        │ DEMO                                │
        │ DANTEST      │ INITIAL MONITORING PROFILE          │
        │ DEFAULT      │ Default Profile                     │
        │ KAREN        │ KAREN'S DEMO                        │
        │              │                                     │
        └──────────────┴─────────────────────────────────────┘

To Select a Profile Use the Arrow Keys and Press Enter, Ctrl_A Add Profile
Ctrl_D Delete Profile, Ctrl_R refresh Profile List, Ctrl_U Update Profile
Ctrl_Z Exit, '*' Indicates Profile is Currently in Use And Can Only Be Viewed
```

FIG. 9 — Profile Selection SCreen

```
31-Aug-1994         MCI 800 TrafficView       Profile Maintenance: ADD

Profile: TESTUSER     Description: THIS IS A TEST PROFILE
Initial Mode: R       Polling Interval: 5 Minutes ┌─────────────────────────── 800 Numbers ───────────────────────────┐
│*123-4567 *123-6567 *123-7567  123-8567  123-9567  124-0567  124-1567│
│ 234-5678  234-7678 *234-8678  234-9678  235-0678  235-1678  235-2678│
│ 345-6789  345-8789  345-9789  346-0789  346-1789  346-2789  346-3789│
│ 456-7890  457-4890  567-8901  568-5901  678-9012  679-6012  989-8989│
│ 990-0989  990-1989  990-2989  990-3989  990-4989  990-5989  999-1110│
│ 999-1116  999-1117  999-1123  999-1124  999-1130  999-1131  999-1137│
│ 999-1138  999-1144  999-1145  999-1146  999-1147  999-1148  999-1149│
│ 999-3110  999-3111  999-3112  999-3113  999-3114  999-5120  999-5121│
│ 999-5122  999-5126  999-5140  999-6114  999-6128  999-6142  999-7116│
│ 999-7130                                                            │
└─────────────────────────────────────────────────────────────────────┘

Ctrl_E Enter Phone Numbers for Profile Directly, Ctrl_F Maintain Top Five
Ctrl_A Add Profile, Ctrl_P Switch to Profile Selection Screen, Ctrl_Z Exit
Ctrl_T Toggle (Select/Deselect) All Phone Numbers for Profile
```

FIG. 10 — Adding a Profile

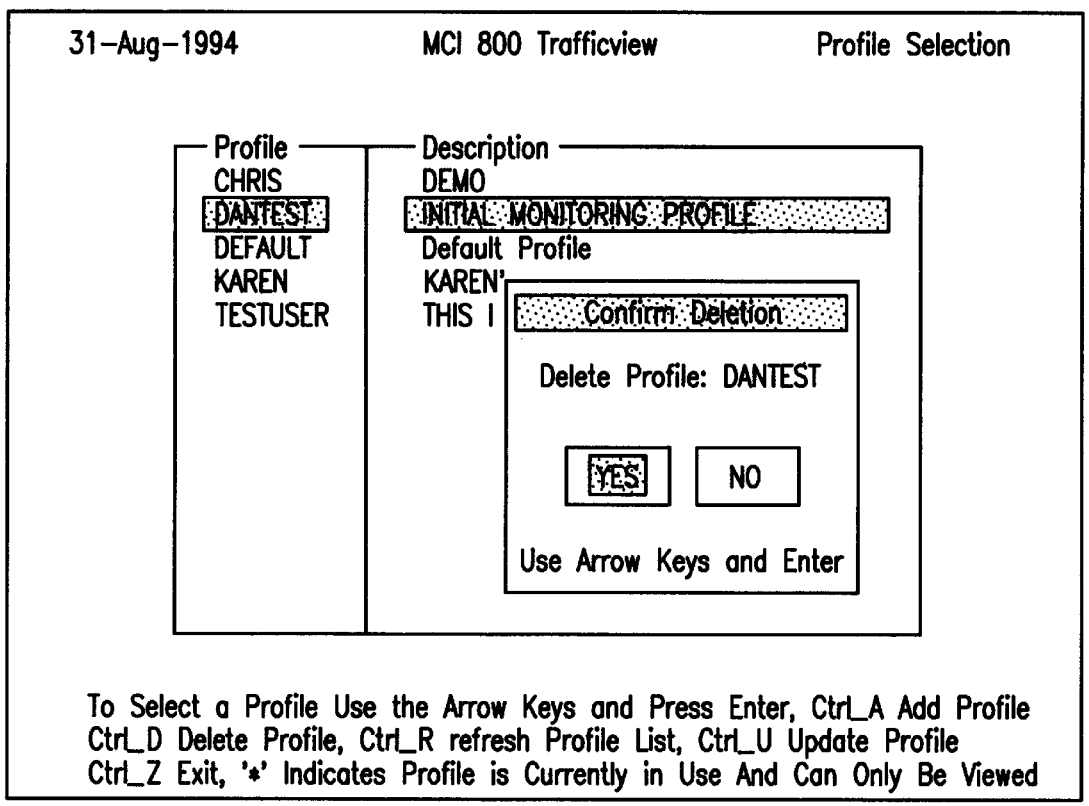
FIG. 11 — Deleting a Profile
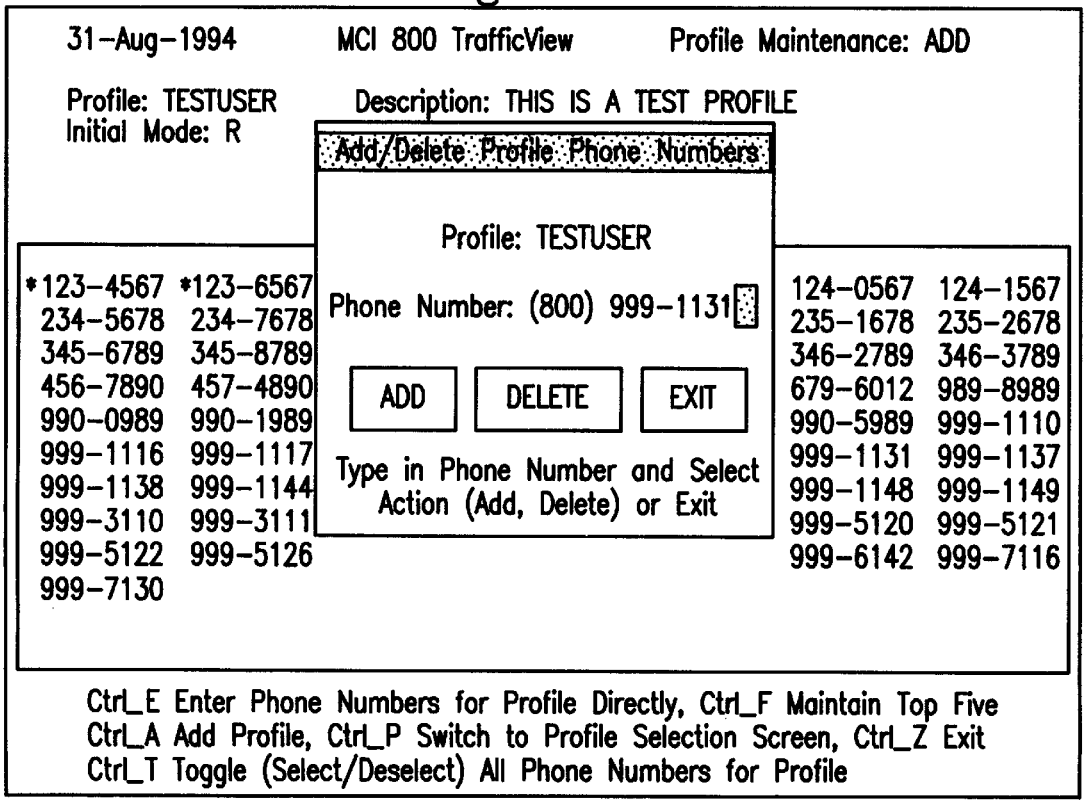
FIG. 12 — Adding a Single 800 Number

| | | | |
|---|---|---|---|
| 31-Aug-1994 | MCI 800 TrafficView | | Profile Maintenance: ADD |
| Profile: TESTUSER | Description: THIS IS A TEST PROFILE | | |
| Initial Mode: R | | | |

```
                    ┌─ Enter Top 5 Phone Numbers ─┐
                    │                              │
                    │      Profile: TESTUSER       │
*123-4567  *123-6567│   (800) 123-4567             │  124-0567  124-1567
 234-5678   234-7678│   (800) 123-6557[]           │  235-1678  235-2678
 345-6789   345-8789│   (800)    -                 │  346-2789  346-3789
 456-7890   457-4890│   (800)    -                 │  679-6012  989-8989
 990-0989   990-1989│   (800)    -                 │  990-5989  999-1110
 999-1116   999-1117│                              │  999-1131  999-1137
 999-1138   999-1144│      ┌────┐   ┌──────┐       │  999-1148  999-1149
 999-3110   999-3111│      │ OK │   │ QUIT │       │  999-5120  999-5121
 999-5122   999-5126│      └────┘   └──────┘       │  999-6142  999-7116
 999-7130           │    Type in Phone Numbers,    │
                    │    Use Arrow Keys and Enter  │
                    └──────────────────────────────┘
```

Ctrl_E Enter Phone Numbers for Profile Directly, Ctrl_F Maintain Top Five
Ctrl_A Add Profile, Ctrl_P Switch to Profile Selection Screen, Ctrl_Z Exit
Ctrl_T Toggle (Select/Deselect) All Phone Numbers for Profile FIG. 13 — Top 5 Number Selection

---

31-Aug-1994          MCI 800 Trafficview          Real-Time Statistics

Profile: DANTEST     Description: INITIAL MONITORING PROFILE

Polling: 5 Minute Interval — Since 19:43 31-Aug-1994 — Current 19:38 → 19:43

```
                         SHORT      DIDN'T      DIDN'T
              INCOMP   C ┌─ Change Polling Interval ─┐
INCOMP   C:     0        │                            │
TOTALS   T:     0        │     Profile: DANTEST       │
                         │                            │
123-4567 C:     0:       │  Enter Polling Interval: 10│
         T:     0:       │      ┌────┐  ┌────────┐    │
345-8789 C:     0:       │      │ OK │  │ Cancel │    │
         T:     0:       │      └────┘  └────────┘    │
                         │    Enter New Poll Interval │
                         └────────────────────────────┘
```

Ctrl_I Inquiry Mode, Ctrl_P Profile Selection, Ctrl_E New Poll Int, Ctrl_Z Exit
Ctrl_T New Poll Start Time, Ctrl_U Summary Statistics, Ctrl_H Other Statistics FIG. 14 — Changing Polling Interval

```
31-Aug-1994            MCI 800 Trafficview         Real-Time Statistics

Profile: DANTEST       Description: INITIAL MONITORING PROFILE

Polling: 5 Minute Interval — Since 19:40 31-Aug-1994 — Current 19:35 → 19:40
                         SHORT      DIDN'T    DIDN'T
              INCOMP    C
INCOMP   C:     0            Change Polling Start Time
TOTALS   T:     0
                                 Profile: DANTEST
123-4567 C:    0:         Start Time: 19:40 31-Aug-1994
         T:    0:
                                  [  OK  ]   [ Quit ]
345-8789 C:    0:
         T:    0:
                           Enter New Start Time for Polling Ctrl_I Inquiry Mode, Ctrl_P Profile Selection, Ctrl_E New Poll Int, Ctrl_Z Exit
   Ctrl_T New Poll Start Time, Ctrl_U Summary Statistics, Ctrl_H Other Statistics
   Enter Starting time HH:HH for inquiry
```

FIG. 15 — Changing Poll Start Time

```
31-Aug-1994            MCI 800 Trafficview         Real-Time Statistics

Profile: DANTEST       Description: INITIAL MONITORING PROFILE

Polling: 5 Minute Interval — Since 00:43 31-Aug-1994 — Current 19:38 → 19:43

— DURATION —
            ATTEMPTS   COMP   INCOMP   OTHER   DTO   AVG    TOTAL
SUMMARY  C:    0        0       0        0      0    0.0     0.0
TOTALS   T:    3        0       3        0      0    0.0     0.0

123-4567 C:    0        0       0        0      0    0.0     0.0
         T:    3        0       3        0      0    0.0     0.0
345-8789 C:    0        0       0        0      0    0.0     0.0
         T:                     0        0      0    0.0     0.0

Ctrl_I Inquiry Mode, Ctrl_P Profile Selection, Ctrl_E New Poll Int, Ctrl_Z Exit
   Ctrl_T New Poll Start Time, Ctrl_U Summary Statistics, Ctrl_H Other Statistics
```

FIG. 16 — Summary Statistics Screen

```
31-Aug-1994            MCI 800 Trafficview        Real-Time Statistics
Profile: DANTEST     Description: INITIAL MONITORING PROFILE
Polling: 5 Minute Interval  -  Since 00:43 31-Aug-1994  -  Current 19:38 → 19:43
```

|  |  | INCOMP | SHORT CALL | DIDN'T WAIT | DIDN'T ANSWER |
|---|---|---|---|---|---|
| INCOMP | C: | 0 | 0 | 0 | 0 |
| TOTALS | T: | 3 | 3 | 0 | 0 |
| 123-4567 | C: | 0 | 0 | 0 | 0 |
|  | T: | 3 | 3 | 0 | 0 |
| 345-8789 | C: | 0 | 0 | 0 | 0 |
|  | T: | 0 | 0 | 0 | 0 |

```
Ctrl_I Inquiry Mode, Ctrl_P Profile Selection, Ctrl_E New Poll Int, Ctrl_Z Exit
Ctrl_T New Poll Start Time, Ctrl_U Summary Statistics, Ctrl_H Other Statistics
```

FIG. 17 — Incomplete Summary Screen

```
31-Aug-1994            MCI 800 Trafficview        Real-Time Statistics
Profile: DANTEST     Description: INITIAL MONITORING PROFILE
Polling: 5 Minute Interval  -  Since 00:43 31-Aug-1994  -  Current 19:38 → 19:43
```

|  |  | OTHERS | ID CODES | TAILOR CALL COVERAGE | EQUIP/NTWK CONGESTION |
|---|---|---|---|---|---|
| OTHER | C: | 0 | 0 | 0 | 0 |
| TOTALS | T: | 0 | 0 | 0 | 0 |
| 123-4567 | C: | 0 | 0 | 0 | 0 |
|  | T: | 0 | 0 | 0 | 0 |
| 345-8789 | C: | 0 | 0 | 0 | 0 |
|  | T: | 0 | 0 | 0 | 0 |

```
Ctrl_I Inquiry Mode, Ctrl_P Profile Selection, Ctrl_E New Poll Int, Ctrl_Z Exit
Ctrl_T New Poll Start Time, Ctrl_U Summary Statistics, Ctrl_H Other Statistics
```

FIG. 18 — Other Summary Screen

```
31-Aug-1994          MCI 800 Trafficview        Real-Time Statistics
Profile: DANTEST      Description: INITIAL MONITORING PROFILE
Phone Number: (800) 123-4567  Disposition: *  Time Range: 00:00 → 23:59
Calling Number  City —— Connect ——— Dur  Serv Location  Disp      DNIS   DTO
(719) 282-1860  001 08-31-1994 04:00 12:00 H9999999      Ring NoAns 1233589

CtrL_I Activate Inquiry, CtrL_P Select Profile, CtrL_R ReaL_Time Stats, CtrL_Z Exit
```

FIG. 19 – Call Detail Inquiry Screen

```
31-Aug-1994          MCI 800 Trafficview        Real-Time Statistics
Profile: DANTEST      Description: INITIAL MONITORING PROFILE
Phone Number: (800) 123-4567  Disposition: *  Time Range: 00:00 → 00:00
Calling Number  C┌──────Call Disposition Selection──────┐      DTO
                │Disposition           │                │
                │*Answered             │                │
                │*Short Call           │ Use The Arrow Keys and Enter
                │*Didn't Wait          │ To Select/Deselect Disposition
                │*Didn't Answer        │
                │ ID Codes             │ CtrL_D – Done, Continue With
                │*Tailor Call Coverage │          Selected Dispositions
                │*NCS Reject           │
                │ NCS Blocked          │
                │*Switch Control       │
                │ Network Block        │
                └──────────────────────┴────────────────┘

CtrL_I Activate Inquiry, CtrL_P Select Profile, CtrL_R ReaL_Time Stats, CtrL_Z Exit
```

FIG. 20 – Call Disposition Selection

```
31-Aug-1994           MCI 800 Trafficview      Real-Time Statistics

Profile: DANTEST      Description: INITIAL MONITORING PROFILE

Phone Number: (800) 123-4567   Disposition: *   Time Range: 00:00 → 00:00
                              ─── Call Detail ───
Calling Numb│ Calling number    (719) 282-1860     Country Code 001
(719) 282-1 │ Connect time      08-31-1994 04:00   Call Duration 12:00
            │ Actual Term       H9999999           Intended term
            │ Disposition       Short Call
            │ DTO Flag                             City    COLORDOSPG
            │                                      State   CO
            │ Outpulse digits 2532523              Suppcode    1233589

Ctrl_L Activate Inquiry, Ctrl_P Select Profile, Ctrl_R Real_Time Stats, Ctrl_Z Exit
```

FIG. 21 — CDR Detail Display

SYSTEM AND METHOD THEREFOR OF VIEWING IN REAL TIME CALL TRAFFIC OF A TELECOMMUNICATIONS NETWORK

This is a continuation-in-part of patent application Ser. No. 08/405,988 filed Mar. 17, 1995 now U.S. Pat. No. 5,610,915.

FIELD OF THE INVENTION

The present invention relates to special service telephone call processing such as 800, 900 and "VNET" calls in a telecommunications network, and more particularly to a system for viewing the traffic of the calls to provide customers or subscribers with special service call disposition statistics and call detail information.

BACKGROUND OF THE INVENTION

In co-pending application Ser. No. 125,230 filed Sep. 23, 1993, now U.S. Pat. No. 5,537,611, a network management of special service calls which allows the management of a telecommunications network to oversee the network to ascertain traffic surges and provide traffic controls to alleviate network congestion is disclosed. In particular, the '611 patent application discloses the utilization of a Data Access Point (DAP) for storing information relating to different special service call numbers, information relating to subscribers who subscribe to the various services, and translation tables that provide the data needed to translate a special service call number into a real call number associated with a particular network switch. A processor associated with the DAP, referred to as a DAP Traffic Statistics (DTS), converts the collected traffic data into statistics data and forwards the same to a compiler processor of an Integrated Network Management System (INMS). The INMS provides reports containing the compiled statistics data for the special service call number to subscribers and the management of the telecommunications network. With the information from the INMS, a subscriber could readjust the parameters for a special service call number and reallocate the calls made to the call number to different destination stations. The management of the network, at the same time, can review the information from the DTS and reroute traffic in the network to avoid congestion or call blocking caused by any one of the special service call numbers. The information provided by the DTS, however, is limited in scope and does not provide data appropriate for some subscribers of the DTS service.

BRIEF DESCRIPTION OF THE PRESENT INVENTION

In support of 800 portability mandated by the Federal Communications Commission (FCC), an MCI Traffic Statistics (MTS) system was integrated with the existing DTS system to provide subscribers with special service calls, for example 800/900, call disposition statistics and call detail information. The service provided by the MTS system is referred to as MCI "TRAFFICVIEW" (MTV) and provides subscribers with insight into their call attempts and completions, beyond current DTS reporting capabilities. The present invention "TRAFFICVIEW" Server (TVS) system is incorporated into the MTV service to provide both statistical reporting functions and call by call details.

TVS provides reporting either hourly, daily, weekly, or monthly, depending on instructions placed by the subscriber. A number of different reports, for example 17, may be generated. These reports may be delivered via "MCI MAIL", fax or hard copy to the respective subscribers. A customer that subscribes to a special Perspective service may also directly download a data file of call statistics from the TVS via a workstation. The source of data for the MTS system is 800/900 Call Detail Records (CDRs) generated by the various network switches. These CDRs are collected by network Adjunct Processors (APs), associated with corresponding ones of the network switches. Once collected, the CDRs are delivered to the MTS system for immediate processing. Upon receipt of the CDRs from the APs, the MTS system will forward periodically, for example hourly, the call statistics to the TVS. The MTS system stores multiple hourly CDRs for each of the special service numbers.

For call by call details, the TVS system is supplied with Enhanced Call Detail Records (ECDR) by the MTS system. For the current embodiment of the instant invention, the statistical data is sent to the TVS system on an hourly basis, and the ECDR data is sent to the TVS system in near real time. These records are used to generate some additional different call detail reports. In addition, these ECDRs are the source of a Real Time Traffic Statistics (RTS) system that enables a subscriber of the system to view in real time the operation of the network, i.e. the statistics relating to the calls directed to the special service call number(s) of the subscriber. In particular, upon signing onto the RTS service, a subscriber is given a password by the management of the network so that he can access directly the TVS system via a transceiver means such as for example a modem. A corresponding transceiver means is provided in the TVS system so that a real time communications link is established between the subscriber and the TVS system. The ECDR data sent to the TVS system can then be accessed directly by the subscriber in substantially real time so that the ongoing operation of the network, at least with respect to the subscriber's special service call number(s), can be monitored by the subscriber. The subscriber can accordingly reallocate his resources, for example redirecting calls to his special service call number to different locations where the operators of the subscriber are located.

In addition to providing real time outputs to subscribers through the RTS system, the TVS system can deliver its outputs, as either reports or data files, to the subscribers, either by means of Personal Computers (PCs), computerized terminals, fax or hard copy output. In particular, the TVS system is interfaced with a mail host, i.e. a message distribution center, for forwarding the reports to the subscribers through either "MCI MAIL", fax or hard copy. Moreover, in addition to the RTS system, by means of a computerized terminal or a personal computer equipped with a modem, a subscriber can directly link up with the TVS system. Alternatively, indirectly via the mail host, a subscriber can obtain the call details of a special service call subscribed by him for a particular period of time instead of real time. Furthermore, the subscriber can download a data file containing the raw call details of the special service call for a particular period of time.

The TVS system is made up of a number of identical processors, so that from a hardware standpoint, there is no single point of failure and there is a 100% redundancy in all hardware. Thus, in the event of complete failover of the main processor, the application software would detect the failover thereof and automatically moves the application to one of the other available backup processors.

The system of the present invention is furthermore configured with a number of subsystems each of which adds to the refinement of this system. For example, a Circuit Availability Database (CADB) system is connected to the TVS system to provide state and country mapping for the CDRs stored in the TVS database. Another system that provides refinement to the reports generated by the TVS system is a Corporate Order Entry System (CORE) in which a subscriber can enter instructions to the TVS system to request that his report be sent to him, for example, at a certain time, frequency or manner. Yet another system that may be added to the TVS system is a Circuit Order Management System (COMS) which provides to the TVS system a file of maps showing the number of service locations and the n-code to a switch, trunk, or regular telephone number.

The present invention provides traffic statistics data as specialized reports and/or data files to subscribers who subscribe to the special service call processing service provided by the network; provides a subscriber the ability to download call statistics from the database of the TVS system so that he can format and design his own reports; provides a subscriber the ability to instruct the system to provide reports on a particular given time through a particular method; provides reports to subscribers that contain greater call details of their subscribed special service calls than other previous systems and methods; and provides real time enhanced call detail records to subscribers so that a subscriber can monitor in real time the operation of the network, so as to be able to effect the necessary changes expeditiously.

BRIEF DESCRIPTION OF THE FIGURES

The above-mentioned aspects and advantages of the present invention will become more apparent and the invention itself will be best understood by reference to the following description of the invention taken in conjunction with the accompanying drawings, wherein:

FIG. 9 is an exemplar profile selection screen;

FIG. 10 is an exemplar adding profile screen;

FIG. 11 is an exemplar delete a profile screen;

FIG. 12 is an exemplar adding a single 800 number screen;

FIG. 13 is an exemplar top five number selection screen;

FIG. 14 is an exemplar changing polling interval screen;

FIG. 15 is an exemplar changing poll start time screen;

FIG. 16 is an exemplar summary statistics screen;

FIG. 17 is an exemplar incomplete summary screen;

FIG. 18 is an exemplar other summary screen;

FIG. 19 is an exemplar call detail inquiry screen;

FIG. 20 is an exemplar call disposition selection screen;

FIG. 21 is an exemplar call detail record display screen;

DETAILED DESCRIPTION OF THE PRESENT INVENTION

An overall view of the "TRAFFICVIEW" system of the present invention is discussed with reference to FIG. 1. As shown, the FIG. 1 architecture basically starts with a plurality of switching means, such as for example a number of switches represented by switch 2, in the telecommunications network. Associated with each switch, for example switch 2, is an Adjunct Processor (AP) 4. One of the main functions of the AP is to perform billing. For each call routed through switch 2, AP 4 generates a Call Detail Record (CDR). The CDR is routed to an Operator Services System (OSS) network 6, which otherwise may be referred to as a X.25 network. Network 6 in turn is connected to a series of processors commonly referred to as Central Retransmitters (CR) 8. The outputs of the respective CRs 8 are provided to a Fiber Distributed Data Interface (FDDI) ring 10. The output of FDDI ring 10 in turn is connected to a MCI Traffic Statistics (MTS) system 12, which is situated in a platform to which another system, namely a DAP Traffic Statistics (DTS), may also reside.

Figure 1:
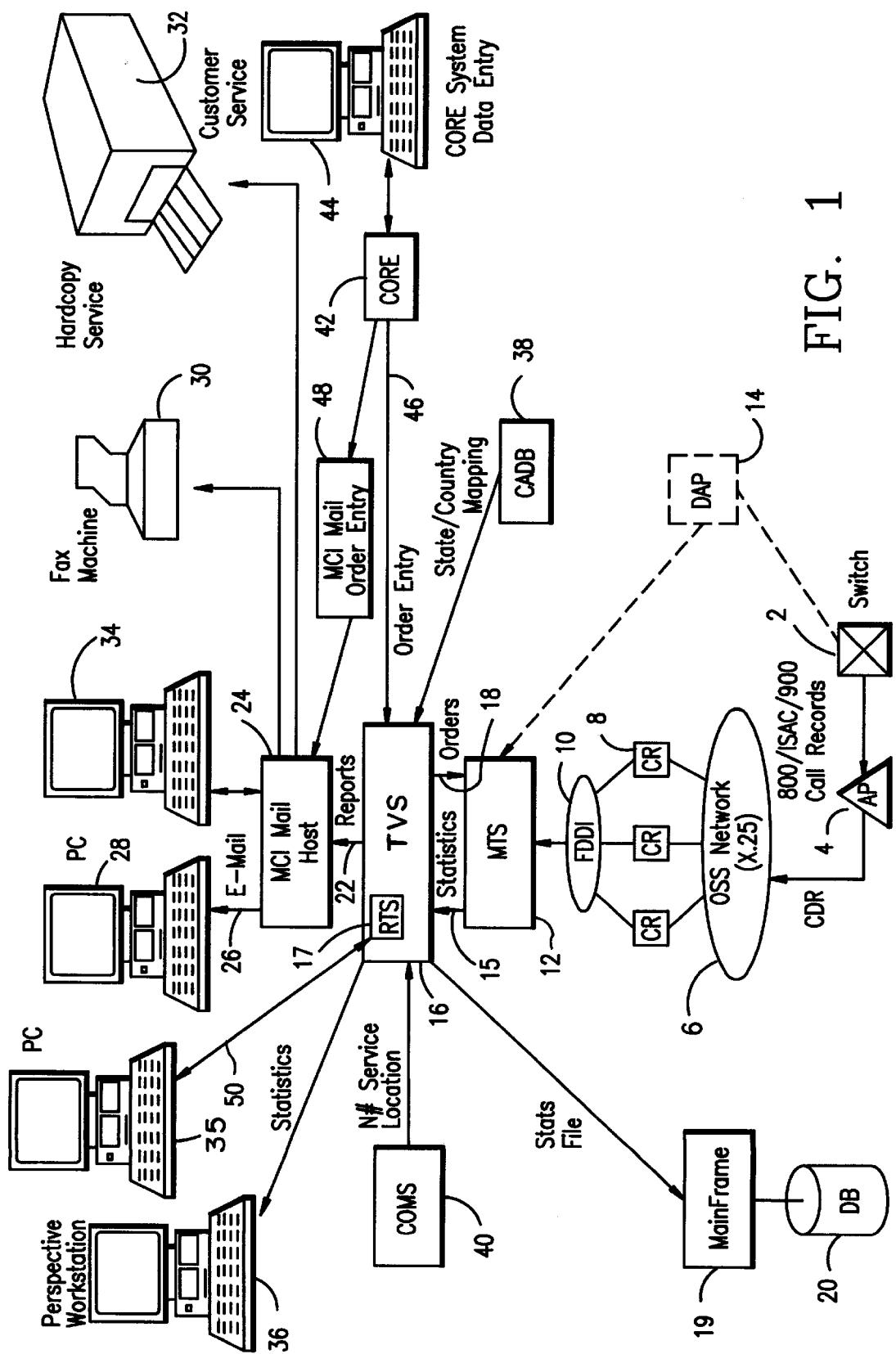
FIG. 1 is an overall view of the "TRAFFICVIEW" system of the instant invention.

DAP refers to a data access point such as DAP 14 shown in the dotted box of FIG. 1. In particular, DAP 14 is a processor system that provides routing information to switch 2. In addition, DAP 14 also provides information to the MTS (or the combination DTS/MTS system) for the traffic statistics monitoring mentioned in the background of the invention section, supra. A more detailed discussion of a DAP and the DTS is given in the aforenoted application Ser. No. 125,230, assigned to the same assignee as the instant invention, and whose disclosure is incorporated by reference herein. For the instant invention, it suffices to note that the platform to which both DTS and MTS reside is referred to only as the MTS system 12.

MTS system 12 is basically a system for counting the number of calls through the various switches. For the telecommunications network of the instant invention, calls are understood to be special service calls including but not limited to 800, 900 and "VNET". For the discussion of FIG. 1, it is assumed that MTS system 12 counts only 800/900 calls, or traffic.

On a periodic basis, MTS system 12 provides statistics data, also referred to as rolled up statistics, via line 15 to a "TRAFFICVIEW" Server (TVS) system 16. As shown, MTS system 12 also receives orders, via line 18, from TVS system 16. For the embodiment of FIG. 1, rolled up statistics are output from MTS system 12 to TVS system 16 at predetermined time intervals such as for example every 60 minutes. It should however be understood that the time intervals in which statistics are rolled up from MTS system 12 to TVS system 16 may be varied. Such periodic rolling up of statistics enables the system to provide periodic outputs to subscribers who request only periodic reports. In instances where a subscriber requests the real time option, the statistics are rolled up from MTS system 12 to TVS system 16 in real time so that a subscriber can access TVS system 16 to monitor in real time the operation of the network.

The process by which rolled up statistics are periodically provided from MTS system 12 to TVS system 16 basically occurs as follows. For a given time period, for example every hour, statistics for customers (subscribers) who have subscribed to the service of the present invention system are accumulated and a customer rolled up peg count message is produced. For the embodiment of FIG. 1, the accumulations are for hourly intervals, with the understanding that future intervals may be set to any time period, for example 20 minute increments. A MTS stats compiler (to be discussed with reference to FIG. 2) writes the customer peg count messages into a "TRAFFICVIEW" server queue. In the case of real time transfer of statistics from MTS system 12 to TVS system 16, the MTS stats compiler writes the customer peg count message directly to TVS system 16, which may be partitioned into two portions, one for receiving the rolled up statistics that are fed periodically while the other for receiving in real time the data from MTS system 12. Real time access is gained through the RTS system, to be discussed later.

For the FIG. 1 embodiment, in brief, an example of rolled up statistics of a 800 number for a given subscriber may contain the following data: that 500 call attempts were made to that 800 number of the subscriber, that 400 of those calls were completed, 50 were not completed (incompletes) and 50 of those calls were blocked. Additional rolled up statistics data may include the destination terminations and the originating Numbering Plan Area (NPA) of the calls. These statistics are stored as records in TVS system 16.

For the FIG. 1 overall view, it is suffice to state that TVS system 16 comprises a number of processors represented for example by a main frame host system 19. Connected to processor system 19 is a storage means, for example a database system 20 which comprises a plurality of memory disks or other storage mechanisms. A more detailed discussion of the hardware components of TVS system 16 and its database system is given, infra. The specific configuration of the database system used with TVS system 16 is given in co-pending application Ser. No. 08/350,186 filed Nov. 30, 1994 entitled "Relational Database System", whose disclosure is incorporated by reference herein.

Continue with FIG. 1. As shown, there are a number of systems communicatively coupled to TVS system 16. In particular, connected to TVS system 16 to receive its outputs, referred to as reports, via line 22, is a data distribution system, also referred to as "MCI MAIL" host 24. Mail host system 24 is a proprietary system of the MCI Communications Corporation (MCI) and is capable of sending out E-Mails, via line 26, to a conventional PC 28 equipped with a modem and appropriate communications software. Mail host 24 can further distribute reports, or data files, from TVS system 16 to a fax machine 30 or as a hard copy message, represented by printer 32, to a subscriber.

Also shown to be connected to mail host 24 is a computer terminal represented as another PC 34. PC 34, interchangeable with PC 28, may be used to obtain a "probe" report from TVS system 16. From PC 34, a subscriber can "probe" into TVS system 16 so that he can retrieve a static picture of his special service number for a specific period of time at a specific date. For example, the subscriber may be a TV programmer who runs a special program on a given day where he asks the viewers to dial a 800 number. If the subscriber wants to see exactly how the program did in terms of audience viewership for the previous hour, he can obtain a static picture of that previous hour by using the probe feature, to thereby ascertain the type of business he could expect. For the probe feature, the subscriber, as shown in FIG. 1, is linked to mail host 24.

Another PC 35 is shown to connect to TVS system 16 via line 50. PC 35 is representative of the personal computers of the various subscribers who subscribe to the service provided by the RTS system so as to be able to retrieve in real time statistics that relate to their special service call numbers. Each PC 35, although not shown, is equipped with a modem communicatively connectable to a corresponding modem at an access port of the RTS system. The different modules of the RTS system are shown in FIG. 9.

Instead of retrieving a static picture of his special service call number such as the "probe" per PC 34, once logged on, a subscriber from PC 35 can monitor in real time, or substantially real time, the operation of the network as it relates to the calls directed to his special service call number(s). Thus, instead of viewing a past event, using the RTS system, a subscriber can have the ability to obtain an ongoing picture of the statistics relating to any, or all, of his special service call numbers. For example, the subscriber can see in real time how many calls are being attempted minute by minute, how many calls are being allowed through the network, how many calls are incompletes, how many calls are blocked, etc. This ability to monitor the operation of the network gives the subscriber the ability to decide in real time the specific actions that need to be taken. For instance, if there is an abnormal number of incompletes for a given period, the subscriber can look at the specific call records that made up those incomplete calls. If needed, the subscriber request the management of the network to restructure the network so as to reroute the incoming calls of the subscriber to different locations where they may better be handled. The various screens which display the various statistics to a subscriber are shown in FIGS. 8 to 20.

Further shown connected to TVS system 16 is a Perspective work station 36. Work station 36 is representative of a plurality of work stations which may be used by the different subscribers of the service of the instant invention to directly access TVS system 16 to retrieve data which the subscribers can then format or design as their own reports, for example imputing data into their spreadsheets. The data file retrieved by work station 36 is referred to as a flat file.

Also connected to TVS system 16 is a Circuit Availability Database (CADB) 38 which periodically provides TVS system 16, more specifically database 20 of TVS system 16, mapping data to correlate NPAs to the different states and localities within the states, and country codes to the different countries for further adding call details for the CDRs.

Also shown connected to TVS system 16 is a Circuit Order Management System (COMS) 40 whose function, for the FIG. 1 embodiment, is to provide a file of maps of the service locations, and the ncodes to switches, trunks, or regular telephone numbers.

Further connected to TVS system 16 is a Corporate Order Entry (CORE) system 42. CORE system 42 receives its input from subscribers via a CORE system data entry system such as for example a terminal or PC 44. In particular, a subscriber can input instructions to CORE system 42 which in turn inputs the instructions as order entries via line 46 to TVS system 16. Some of the data provided by the subscribers to CORE system 42 may include the type of reports the subscribers like to receive, the number of reports the subscribers want, the frequency and how the reports should be sent, and where the reports should be delivered to. With respect to the method in which the reports are to be delivered, CORE system 42 sends instructions to a "MCI MAIL" order entry system 48, which in turn forwards the instructions to mail host system 24. Consequently, a subscriber who has instructed TVS system 16 that it should sent to him his reports in a E-Mail format would receive his reports in a PC format per PC 28. In the case where he wants to access TVS system 16 directly, the subscriber needs to request through CORE system 42 for real time access. The management of the network, in receipt of the order entry from CORE system 42, will send to the subscriber a password which enables the subscriber to log into RTS system 17, via the transceiver means provided at its I/O ports, on a real time basis.

Figure 2:
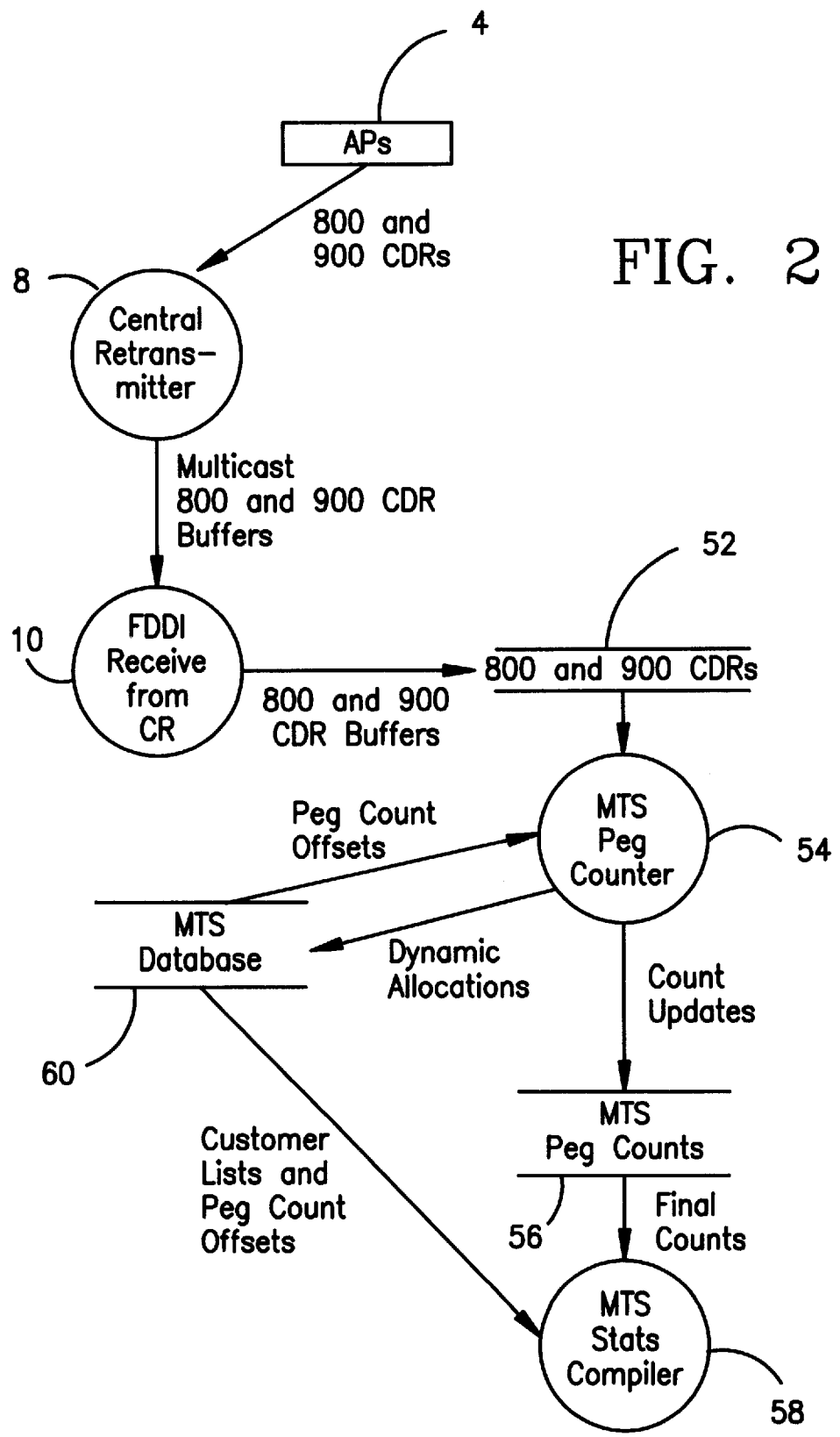
FIG. 2 is a diagram illustrating the functions of the MCI traffic statistics system of the present invention "TRAFFICVIEW" system.

The transmission of data between APs, such as AP 4, and MTS system 12 is given with reference to FIG. 2. As shown, 800 and 900 CDRs are collected from APs 4 and routed to central retransmitters 8, which are protocol conversion processors. In essence CRs 8 convert the data from APs 4, which are VAX OSI Transport System (VOTS) messages that are delivered on the X.25 network, into a multi-cast M messages. (OSI is Open System Interconnection).

MTS system 12 collects CDRs from all APs. The CDRs are collected and buffered at each AP, and sent to MTS system 12 using the OSI class 4 Transport Service (OSI TP4). The CDRs (per buffer) are received at MTS system 12 by a process called the AP OSI communication manager, or AP OSI CM. The AP OSI CM process is responsible for communication between MTS system 12 and the APs. This process runs simultaneously on all of the processors (to be discussed later) of MTS system 12 where each CM receives CDRs from a specific number of APs over OSI transport connections on the OSS NET. This involves establishing and maintaining sessions to receive 800/900 number CDRs from the APs. As each CDR buffer is received from the APs, it is forwarded to the application being run on the processors of MTS system 12. This is done by transferring each buffer (of CDRs) to an Ethernet transmit process, also running on the MTS communication servers. The Ethernet transmit process then uses the Ethernet multi-cast protocol to send the buffer to the application running in MTS system 12.

In terms of the external interfaces, the AP OSI CM process receives CDR messages from the APs by establishing a transport connection via the Packet Net System Interface (PSI), which is used to establish Shared Virtual Circuits (SVCs) over the OSSI NET 6. The CM interfaces to the Ethernet transmit process over a Virtual Memory System (VMS) mailbox where the CM puts the AP CDR message to be multi-casted on the MTS lan. The AP OSI CM maintains a VMS global section where various statuses and perform statistics are kept and updated.

Each AP, as was discussed earlier, is collocated with a switch 2. The AP receives all CDRs generated by switch 2. The records generated by a switch can be in many different categories: for example Call Detail Records (CDRs), Private Network Records (PNRs), Operator Services Records (OSRs), Private Network Operator Services Records (POSRs), and Switch Event Records (SCRs). For the understanding of the instant invention as exemplified by the embodiment of FIG. 1, the only records that are forwarded to MTS system 12 by each AP 4 are the originating switch 800 and 900 CDRs. A filtering algorithm is employed at each AP for filtering the appropriate CDRs.

In sum, Transport Service Data Units (TSDUs) are received by the AP OSI CM. Each of the TSDUs contains CDRs from the AP in a format whereby it contains a AP MTS header which may be for example 16 bytes long. The AP MTS header may contain a switch ID identifying the switch where the CDR is from, the CDR count and a filler for filling unused bytes. The AP MTS header is followed by up to 23 CDRs, each of which is 64 bytes long. These multi-cast 800 and 900 CDRs are forwarded by CRs 8 to FDDI ring 10.

The process performed by FDDI 10 is as follows. FDDI 10 receives the CDRs for MTS 12, and buffers Application Data Field (ADF) message pairs, fraud messages and call detail records from the CRs 8. These CDR messages are put in a queue for the MTS peg counter 52. The CDRs from counter 52 are then forwarded to a MTS peg counter 54 in MTS system 12. The outputs from MTS peg counter 54 are provided to a MTS customer service database 60 and also MTS peg counts buffer 56. The process under which MTS peg counter 54 operates is as follows.

First, the MTS peg counter enhances the call detail record by performing data look-ups on the feature group C, virtual trunk, direct termination overflow and international SAC databases. For the received call records, the MTS peg counter does a database look-up using the pre-translated dialed digits as the key. The look-up will yield the virtual memory address of the necessary peg count storage areas for each 800 number, and a list of counting services to provide for the CDR. There is a linked list header for each possible kind of peg count that an 800 number can have.

MTS peg counts are stored as a virtual memory address of a linked list header. There are two linked list headers per 800 number and peg count type—one for current peg count statistics and the other for the inactive peg count statistics reporting by an MTS statistics compiler 58. Actual peg counts are stored in linked lists, indexed by hour. Call record time points are normalized to Universal Coordinated Time (UCT) based on the switch/AP time. Because of the call record transfer delay between the switch, AP and MTS, MTS needs to store peg counts for multiple hourly intervals for each 800 number. Hourly intervals are sorted in reverse chronological order to expedite peg count storage searches. The peg counter continues to store peg counts for each hourly interval for a configurable interval after the reporting interval. Assuming the initial setting to this configurable interval is 10 minutes, the MTS peg counter will continue to store peg counts for each hourly interval unit 10 minutes after the reporting interval is over.

Dynamic allocation is done by the MTS peg counter with a "Doggie Bag" for temporary storage of incoming call records that require a database update before processing. When an 800 number or a termination is not found, the call record is stored in the MTS Doggie Bag. The MTS peg counter requests the database lock, with asynchronous notification through an AST routine. When the lock is granted the AST routine sets a flag indicating the lock is granted. After each buffer of incoming call records has been processed, the MTS peg counter makes the necessary database updates, then processes the record normally, bumping up the appropriate 800 number peg counts.

MTS total call counts provide a summary of total minutes and call completions broken down by the 800 number. These counts can be rolled up to TVS system 16 to provide total minutes and the call completion ratio by customer ID. Total counts include:

Total Completions

Total Call Duration

Total Attempts

Total Switch Controlled Calls (No Action Code Received)

Total NCS Blocked (Action Code 30 Received)

Total NCS Rejected (NCS Failure Action Code Received)

Total Network Blocked (All Routes Busy)

Total Supp Code Blocked

Total Out of Band Blocked

The call completion ratio can be determined for a given 800 number and rolled up under the customer ID to provide call completion statistics, and total call minutes on a customer by customer basis.

$$800 \text{ Call Completion Ratio} = \frac{\text{Completions}}{\text{Attempts} - (\text{Switch Controls} + NCS \text{ Blocks} + NCS \text{ Failures} + ARBs)}$$

MTS NPA counts are compiled and stored hourly as a block of 160 NPAs. The NPA counts include:

Originating NPA

Total Attempts per NPA

Total Completed Calls per NPA

Total Calls Not Delivered (Blocked) per NPA

Total Attempts for International Originations

Total Completed Calls for International Originations

Total Calls Not Delivered (Blocked) for International Originations

MTS NPA-NXX counts are compiled and stored hourly as a block of 160 NPAs with their associated NXXs. The NPA-NXX counts include:

Attempts from International Originations

For each Originating NPA . . .

Attempts for each unknown NXX (for FG-C Originations,)

For each NXX of Origination

Attempts from that NXX

MTS counts for an 800 number are broken down by termination and compiled hourly. Call statistics for terminations include:

Termination Type

Termination Address

Total Completions

Total Call Duration

Call Disposition

Call dispositions indicate the cause of an incomplete call. Terminating call dispositions include:

Total Short Calls. Short calls are calls lasting less than 4 switch ticks with no answer detected. This typically indicates a busy condition. (Each Switch tick is presumed to be 3 seconds).

Total Didn't Wait. Didn't Wait calls are calls lasting from 4 through 8 switch ticks with no answer detected. This typically indicates a call is not answered within 4 ringing cycles.

Total Didn't Answer. Didn't Answer calls are calls lasting beyond 8 switch ticks with no answer detected. This typically indicates a call is not answered within 6 ringing cycles.

Every hour, the MTS peg counter wakes up MTS statistics compiler 58, which then performs sequential traversal of MTS customer service database 60 to generate statistics for every 800 number. The MTS service type (a field in the MTS customer service record) informs the statistics compiler which statistics are being kept for this 800 number (i.e. 800 totals, termination counts, NPA counts, NPA-NXX Counts).

A data driven MTS statistics compiler records the services a particular 800 number is registered for; including reporting interval (hourly), statistics destination (MTS server), priority (real time, non-real time), and time offset (usually zero) for statistics delivery.

MTS statistics compiler 58 reads MTS customer service database 60 in priority order, so statistics are processed for all real time 800 numbers first, followed by statistics for the non-real time 800 numbers. The priority feature allows MCI 800 "TRAFFICVIEW" subscribers who are signed up for hourly data to gather their data first, while subscribers who only want daily, weekly or monthly reports from the TV server of TVS system 16 will get their data later. TV server may also be referred to as a TARS (Traffic Analysis Reporting System) server.

For each 800 number found in the MTS customer service database 60, MTS statistics compiler 58 finds the matching peg counts in memory and constructs an "MTS Peg Counts Message for an 800/900 Number". A MTS send out routine is invoked to send each message to TVS system 16.

The "MTS Peg Counts Message for an 800/900 Number" consists of a fixed message part and a variable number of optional parameters. The fixed message part identifies the 800/900 number for which the statistics are being reported, the time interval the statistics are from and other key information. The optional parameters that are reported for a given 800 number depend upon the service identified for the 800 number in MTS database 60. The following table identifies the service types and their corresponding optional parameters:

| Service Type | Optional Parameters in B.1 Message |
| --- | --- |
| 1. Total Service | EF - MTS Totals Counts |
| 2. Termination Service | EF - MTS Totals Counts |
|  | EC - MTS Counts by Termination |
| 3. Standard Service | EF - MTS Totals Counts |
|  | EE - MTS Counts by NPA |
|  | EC - MTS Counts by Termination |
| 4. Demographic Service | EF - MTS Totals Counts |
|  | EE - MTS Counts by NPA |
|  | ED - MTS Counts by NPA-NXX |
|  | EC - MTS Counts by Termination |

MTS statistics compiler 58 does not begin reporting on an hour until a configurable interval (default 5 minutes) after the hour. As each statistics message for a given hour is constructed and sent, MTS statistics compiler 58 frees any memory used to hold peg counts for the current 800/900 number. This memory is returned to a common pool of free memory, available for use by the peg counter as needed.

After sending all of the required statistics messages for a given hour, MTS statistics compiler 58 sends an "MTS Switch/AP Report Status Checkpoint Message" to the server. This message serves two purposes: (1) it informs TVS system 16 that all messages for an interval have been sent; and (2) it shows the TVS system 16 how accurate the 800/900 number data it received is, by showing how far behind each Switch/AP is in sending statistics messages to the MTS.

Ideally, the "Last Call Record Disconnect" time point for each Switch/AP is sent after the end time of the hourly interval. That means that the Switch/AP is keeping up with traffic levels, but does not necessarily mean that the data reported for an 800 number is entirely complete. There is still the possibility that long duration calls have not disconnected, and therefore will not be reported until the next hour.

Also after generating the 800 number statistics messages, MTS statistics compiler 58 generates an "MTS Network Statistics Message". This message is not sent to TVS system 16 but is only written to the test files or the test multi-cast address. The message is useful for network management purposes, for gauging traffic levels throughout the day and for determining the transition mix at intelligent network platforms such as Network Control System (NCS).

After all statistics messages are generated for an hour, MTS statistics compiler 58 hibernates, waiting to be awakened again by the MTS peg counter 54 for the next hour. Note that although "hourly interval" has been described as the basis on which MTS statistics compiler 58 runs, in actuality, the interval is completely configurable to be any reasonable time period. In fact, the interval for MTS statistics compiler 58 may be set to five minute intervals such that statistics messages are generated every five minutes and forwarded to MTS system 12. By shortening the "interval" to such a short time period, the statistics provided to TVS system 16, and therefore to RTS system 17 through which a subscriber can log on, becomes substantially in real time. For those subscribers who continue to want only periodic reports or updates, the five minute interval statistics can be summed to achieve the desired duration. For example, if a subscriber only wants hourly updates, statistics for 12 consecutive five minute intervals are summed to provide the hourly updates.

Figure 3:
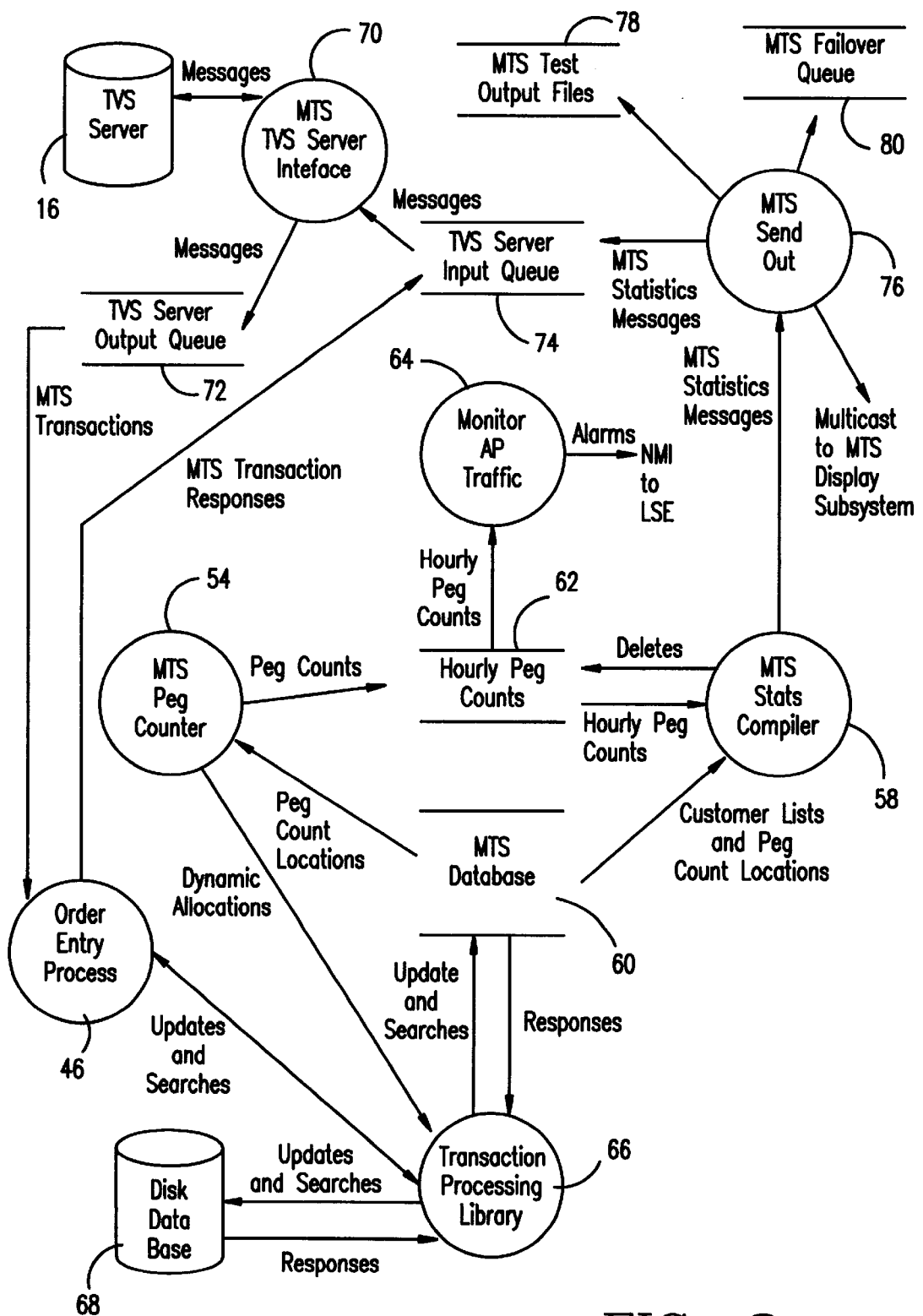
FIG. 3 is a diagram illustrating the different functions of the MCI Traffic Statistics (MTS) system, in receiving data and transmitting that data to the "TRAFFICVIEW" Server (TVS) of the "TRAFFICVIEW" system of the present invention.

FIG. 3 provides a more comprehensive view of the different operations of MTS system 12, and the relation of those operations to the exchange of information between MTS system 12 and TVS system 16.

In particular, as shown in FIG. 3, the hourly peg counts, stored in buffer 62 from MTS statistics compiler 58, is monitored in Monitor AP Traffic process 64. Process 64 is responsible for sending alarms to the Network Management Interface (NMI) and the Local Support Element (LSE) whenever an AP fails to send messages to MTS system 12 within a pre-configured time period. For the embodiment of this invention, the time period is assumed to have a default setting of 5 minutes. This process continues to send alarms every 5 minutes as long as no messages are received from an AP. Also with respect to the instant embodiment, the first two alarm messages are assumed to be sent as warnings. Further assume the third alarm message is sent to indicate that there is in fact an error.

Data is exchanged from MTS database 60 to a Transaction Processing Library (TPL) 66. TPL 66 is a centralized, table driven set of software routines that are callable by any process for modifying or searching through its associated memory or disk database 68. TPL 66 is called through an TPL interface by the MTS administration processes. MTS Statistics compiler 58 and peg counter 54 call hash routines directly to perform database searches. All other functions performed by those processes and all of the other processes access TPL 66 directly through a TPL controller. TPL 66 also allows a transaction to back out from the database when any part of the transaction fails.

With respect to MTS system 12, TPL 66 maintains these databases
    Customer Definition,
    Monitored Customer,
    Termination by 800/900 number,
    Termination counts by originating NPA,
    MTS Customer Service,
    MTS 800 Service Types,
    MTS Network Service Types,
    MTS Destinations,
    MTS Network Service.

TLP 66 maintains these lists
    Real time customer list; and
    Non-real time customer list.
TPL 66 maintains these arrays
    Switch/ARU Array
    DAP Transaction Server Array
    NPA/Location descriptions
TPL 66 maintains MTS control block.
For MTS system 12, among other functions, TPL 66 supports the following
    Add an 800/900 number
    Delete an 800/900 number
    Search the Customer Definition file for a record
    Add a termination to an 800/900 number
    Delete a termination for an 800/900 number
    Search the "Termination of an 800/900 number" file for a record
    Update a "Termination of an 800/900 number" record
    Add a switch/ARU
    Delete a switch/ARU
    Add a transaction server
    Delete a transaction server
    Initialize TPL
    Search the Termination by 800/900 number file (TRMN00)
    Update an NPA
    Update a switch
    Search for a switch
    Update the MTS control block settings
    Update an MTS monitored 800/900 number
    Search for an MTS monitored 800/900 number
    Add an MTS feature group C record
    Delete an MTS feature group C record
    Search for an MTS feature group C record
    In addition to corresponding with MTS database 60 and its associated disk database 68, TPL 66 also corresponds with an order entry process, such as that represented by line 46 (FIG. 1) performed by CORE system 42. Specifically, order entry process 46 is responsible for taking MTS transactions received from the TVS system 16, and applying the appropriate updates to MTS database 20. As shown in FIG. 3, the TVS transactions are received from the TVS server process 70 via a TVS server output queue 72. The order entry process 46 then invokes an application from TPL 66 to execute the transaction. A response is received from TPL 66 and a MTS transaction response message is constructed and sent back to TVS server interface 70 via a TVS server input queue 74.

The MTS/TVS server interface process 70 is responsible for detecting link outages between the MTS system 12 and the MTS server. Upon link failure, MTS server interface 70 archives MTS statistics messages in a safe stored queue. The archive messages are sent in a First In First Out (FIFO) order when the link resumes normal operation.

If failover occurs during statistics compilation on a primary MTS node, MTS/TVS server interface process 70 begins to read messages from MTS statistics compiler 58 and send the messages to MTS system 12. If failover occurs when statistics compilation is complete, there should be little or no data in the MTS/TVS server queue for MTS server interface process 70 to read.

The MTS/TVS server interface 70 also is responsible for receiving MTS transaction messages from the server in MTS system 12. Incoming MTS transaction messages are placed in TVS server output queue 72 for the order entry process 46 to read and process.

Further with respect to FIG. 3, note that the TVS server input queue 74 has provided as one of its inputs MTS statistics messages from a MTS send out process 76. The MTS send out process 76 is a central routine that sends out all MTS output messages. MTS send out process 76 is able to send messages to the TVS server, multi-cast to a MTS display subsystem (not shown) and to MTS test output files 78. Moreover, as was mentioned previously, any failover messages are sent via MTS send out process 76 to a MTS failover queue 80.

The different types of MTS statistics are listed hereinbelow.

MTS incoming statistics

The number of call detail records received broken down by, message type, messages with invalid transaction IDs, and counts of the message buffers that are dropped. (Each buffer has a sequence number. When a buffer is received out of sequence this count is incremented)

Total current MTS TPS,

MTS Monitored 800/900 numbers TPS,

Peak MTS TPS since monitoring was initiated,

A real time bar graph showing the current MTS TPS, and

A count of the number of TVS server transactions received, a count of how many of them caused failure responses, and a count of how many of them caused success responses.

MTS system statistics

Total current MTS TPS;

MTS monitored number TPS;

Output messages sent to TVS server;

Output messages sent to NMI;

Number of MTS monitored numbers broken down by service subscription:
800 totals counts
800 termination counts
800 NPA counts
800 NPA/NXX counts How much memory has been allocated, used, and is available for each of the databases, files and peg count areas.

MTS outgoing statistics

Output configuration:
800 number and termination dynamic allocation flag
Termination dynamic allocation only flag
Send output to TVS server
Send output to MDS
Send output to test output file
Send output to remaining 5 alternate destinations Output to the TVS server broken down by message type, Dynamic allocation alarms broken down by database type.

MTS current peg counts

Monitored 800/900 numbers

Termination for a specific 800/900 number

NXX counts for a specific 800/900 number

AP Statistics counts

Network statistics counts

Figure 4:
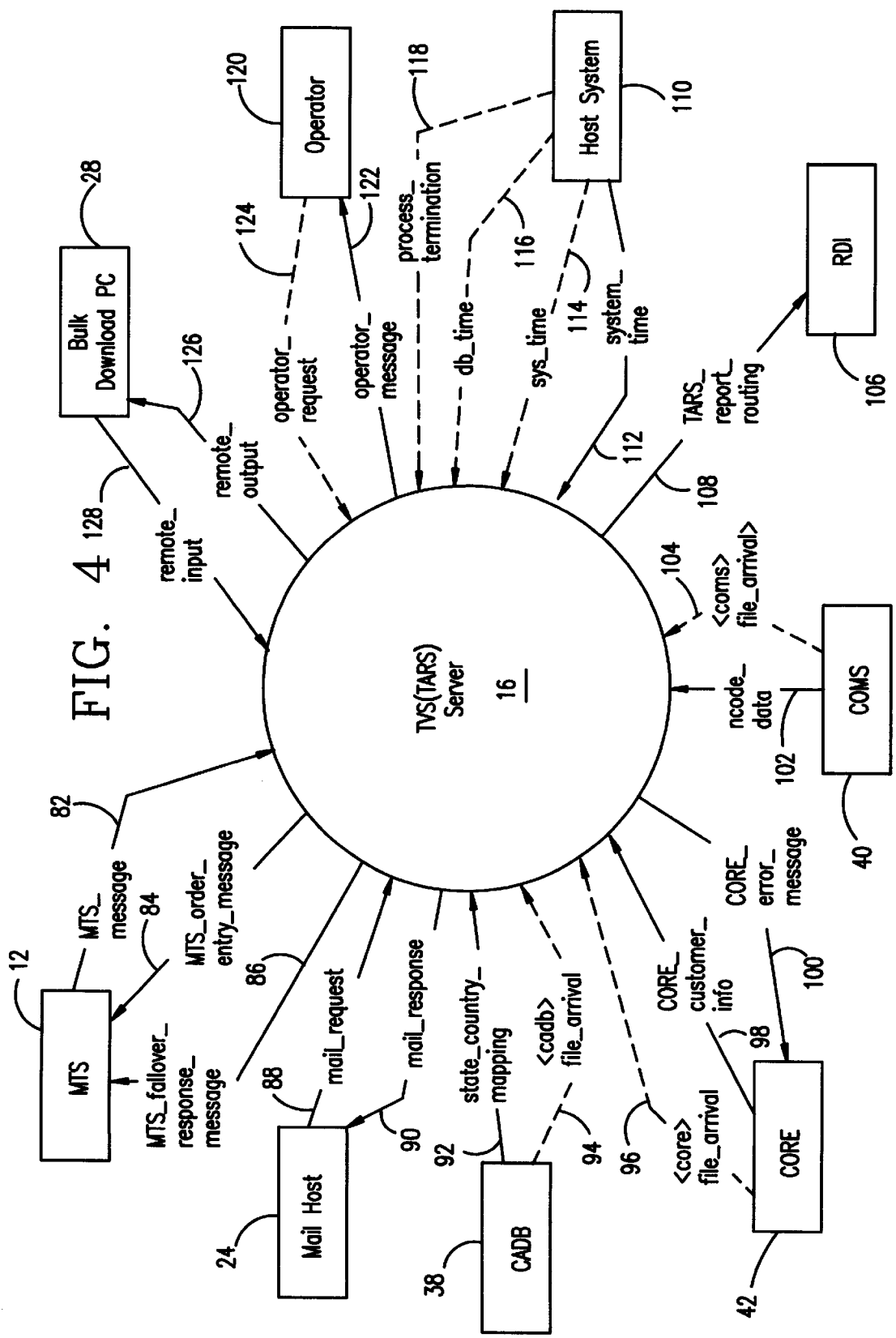
FIG. 4 is a diagram illustrating the functional relationships between the TVS system and the various systems connected thereto in the "TRAFFICVIEW" system of the present invention.

With reference to FIG. 4, the operation of TVS system 16, as represented by its TVS server, is discussed. As shown, TVS server 16 interfaces with a number of systems, among which include MTS system 12. The interfacing between MTS system 12 and TVS server 16 is of import, and a discussion thereof is given hereinafter.

In particular, the MTS and TVS systems, more specifically their respective servers, exchange information via a pair of communications managers (CM). These are the MTS send CM and TVS receive CM. The processes performed by the two communications managers implement a client/server arrangement between the MTS and the TVS systems. Together, the two communications managers (processes) provide a bidirectional data transfer path between the MTS and TVS systems. Each CM has an input and output queue. A message written to the input queue of one CM is transmitted to the other CM and placed in that CM's output queue.

The MTS send CM accesses the client in the client/server arrangement, as it is responsible for establishing a transport connection between the two processes. The TVS receive CM acts as the server, as it accepts transport connections from one or more MTS send CM clients.

The communication mechanism between the MTS and TVS systems is via an OSI class 4 (or OSI TP4), an error detection and recovery transport server that provides reliable full-duplex, connection oriented data transfer between OSI-compliant systems. For the connection, VLTS is used.

There are two data flows between the two systems, namely a call completion statistics and call detail data flow from the MTS to TVS system, and administrative control messages flow from the TVS to MTS system. The call completion statistics messages and call detail messages make up the great bulk of the traffic. Since there is a large volume of call statistics and call detail to be quickly transferred and the destination queue on the TVS system is of finite size, a sliding window protocol is used on top of the transport layer to allow rapid data transfer and to avoid overfilling the output queue of the TVS server. The administrative control message volume and timing requirements are such that a windowing mechanism is not employed from the TVS CM to the MTS CM.

Thus, the MTS send CM functions as follows:

1. A transport connection is established to the TVS receive CM.
2. An asynchronous read is posted on the transport connection.
3. A series of asynchronous reads, determined by the window size, is posted on the input queue.
4. When a message is placed in the input queue, it is removed from the queue and written to the transport connection.
5. When an acknowledgement message is received from the TVS receive CM over the transport connection, another read is posted to the input queue and the read is reposted to the transport connection.
6. When an order entry message is received from the TVS receive CM, it is placed in the output queue and another read is posted on the transport connection.

The TVS receive CM functions as follows:

1. The receive CM accepts a transport connection from the send CM, and posts an asynchronous read to the connection.
2. An asynchronous read is posted to the input queue.
3. Messages are read from the transport connection, placed in the output queue, and an acknowledgement message is written back to the transport connection.
4. Messages are read from the input queue and written to the transport connection.

Both CMs keep link status information and transaction peg counts in a global section. A monitor program is supplied with each CM to map to this global section and display the status and transaction information.

Return to FIG. 4. As shown, the server of MTS system 12 sends a plurality of MTS messages to the server of TVS system 16 via the MTS Message line 82. Specifically, for the instant embodiment, the MTS server provides 800/900 call dispositions and call detail statistics to the TVS server. The following are the type of call dispositions sent: total short calls (including busy calls), total did not wait calls, and total did not answer calls. The following call detail statistics are extracted from the switch call record information elements: total completions (answered calls), total call duration (call minutes), total attempts, totals by terminating address, totals by NPA, totals by NPA-NXX, total switch controlled blocks, total network block calls.

The following noninclusive information for Enhanced Call Detail Records (ECDR) are also sent from the MTS system 12 to TVS system 16 in a steady stream: dialed number, calling number, output digits, originating switch, originating trunk, call origination time (TP1), connect time (TP3), answer time (TP6), disconnect time (DP7), call duration, ring duration, originating MPA, disposition, intended termination type/address, actual termination type/address, corporate ID, origination country code, originating port ID. In addition to providing call details to TVS system 16, MTS system 12 also sends messages to TVS system 16 via line 82. Some of these messages may include a message that the system is falling over from one node to another. It could also be a response message to an order entry message that was sent to the TVS system 16 by CORE system 42. It could further be a check point message sent at the end of every hour after the MTS server has sent all of the statistics, and that those statistics are indeed all of the statistics to be received from the past hour.

A second link connecting MTS system 12 and TVS system 16 is a MTS order entry message line, designated 84. This is when the TVS system has received an order from CORE system 42, and the TVS server has to send a message to the MTS server to instruct MTS system 12 to gather the data required, for example, for a specific 800 number. In other words, the message from the TVS server requests the MTS server to capture data for the specific 800 number at a specific level, of which there are four for the instant invention.

The first level is a capture statistics only level which provides information on call attempts. It is a summary information level that indicates, for example, that there are these many calls, these many calls were completed, these many calls were incomplete calls, and these many calls were blocked. The second level provides all of the information provided in the first level, and information relating to the terminations where the completed calls went. The third level is a combination of the first and second levels and the addition of the originating NPA. The fourth level includes the information of all of the first to third levels plus the NXX (exchange code) for origination.

A third link 86 that connects the MTS server to the TVS server is the MTS fallover response message line. This is the connection used by the MTS system 12 to inform TVS system 16 that there has been a fallover from a first processor of MTS system 12 to its backup processor. In essence, MTS system 12 in actuality comprises two processors that are mirror images of each other. Thus, if one of the processors breaks down, the other processor takes over. Link 86 provides an indication from the MTS system 12 to the TVS system 16 that the backup system has taken over.

Also communicating with the TVS server is mail host 24. As was discussed previously, mail host 24 in essence is a system through which the reports from TVS system 16 are sent to the different subscribers. These reports can be sent via E-Mail, fax or as hard copies. A request for mail is sent by mail host 24 to the TVS server via line 88.

There are two types of mail requests. One is a probe where the customer requests a report for a specific special service call number, for example an 800 number, for a specific time period at a given date in a summary format. In other words, the number of calls that went to the specified 800 number, the number of calls that were completed, the number of incompletes and the number of calls that were blocked are in the report. The other type of request from mail host 24 to the TVS server is a retransmission request when the subscriber has not received his report. For whatever reason, the mail request is forwarded to a help desk of the TVS system so that the subscriber can request that a duplicate report be recreated and retransmitted to him. To answer the requests, the TVS server provides responses to mail host 24 via line 90.

A Circuit Availability Database (CADB) 38 is connected to the TVS server by means of line 92. In essence, CADB 38 provides the TV server a file on a periodic basis that contains information which allows the TV server to map the NPAs to states, NPNX to cities and other localities within the states. The file also provides mapping information to the TVS server to map country codes to country names, for example 44 being representative of the United Kingdom. It is this information from CADB 38 that the TVS server uses for outputting reports that provides answers to the subscriber on where calls to his special service call number come from.

Also shown connecting CADB 38 to the TVS server is a dotted line 94. For our discussion, the dotted lines on FIG. 4 represent triggers that indicate that something has happened. For example, line 94 indicates that the file from CADB 38 has arrived at the TVS server and that the TVS server needs to process it.

CORE system 42 is connected to the TVS server of TVS system 16 via lines 96, 98 and 100. Line 98 represents a customer information line through which files containing orders for reports, or orders to turn off reports as the case may be, are provided from CORE system 42 to the TVS server. Line 96 is a trigger that shows that a CORE file has arrived and that the TVS server should begin to process it. Line 100, on the other hand, is a CORE error message line from the TVS server to CORE system 42. This line is used by the TVS server to transmit to CORE system 42 an indication that a record of a file being processed by the TVS server has been rejected. For example, the TVS server may reject a record because it has an incorrect address or does not have any phone number with it.

In sum, the interaction between TVS system 16 and CORE system 42 is as follows. A file is sent from CORE system 42 to TVS system 16. A trigger is then sent by CORE system 42 to the TVS server to inform the latter that the file has arrived. The TVS server then processes the file, looks for any error, and if an error is found, sends a message back to CORE system 42 to inform it of the error. At approximately the same time, the order entry information is sent by the TVS server to MTS system 12 via line 84.

The TVS server also interacts with Circuit Order Management System (COMS) 40. It does so via lines 102 and 104. COMS system 40 in essence provides an ncode or service location data to the TVS server via line 102. An ncode is an eight digit character, the first character of which being always N and the remaining seven characters being always numbers. It is also referred to as a service location by which a subscriber can determine the termination point of a call. For example, when a subscriber sees a bill for an 800 number, he usually does not see the termination point from which the call originates. Rather, he will see that his 800 number (for example N 555-1111) had received so many call attempts. The termination report provided to a subscriber allows the subscriber to compare the report with his invoice for any discrepancies. For example, if the telecommunications network company has billed the subscriber for 500 calls while the report indicates that only 495 calls were made, the subscriber can then find out from the company why there is a discrepancy of 5 calls. Line 104 is a trigger that informs the TVS server that the file from COMS system 40 has arrived.

The TVS server is also connected to a Report Delivery Interface (RDI) 106. RDI 106 is a part of the "MCI MAIL" host system 24. It is broken out in FIG. 4 to show that reports actually go to an interface from the TVS server, via line 108. To elaborate, the TVS server does not know how to create an "MCI MAIL" message, even though it creates the report and knows which subscriber is supposed to get the report. Thus, a message is send to RDI 106 informing it that here is a file containing the body of the report and the address for which the report is to be sent. RDI system 106 then takes that report file, the address (or a list of addresses) and creates a mail message. This mail message is then provided to mail host 24 so that it can be delivered as either an E-Mail, fax or hard copy message.

The next system that communicates with the TVS server is a host system 110, which is the TVS system itself. Host system 110 in essence is the operating system where certain information required for operation of the TVS server is provided. For FIG. 4, it is assumed that the TVS server is in fact an application being performed by host system 110. Host system 110 provides a number of triggers to the TVS server for further processing. For example, via line 112, host system 110 provides a system time to the TVS server so that the TVS server can generate a time stamped report. Via line 114, host system 110 provides the TVS server a trigger of a particular time when the TVS server needs to perform some function. For instance, the system time from line 114 may trigger the TVS server to automatically generate a number of reports, some of which may be generated hourly, daily, or weekly. This is a background process that schedules the generating of reports on a periodic basis.

Line 114 is a system time line trigger by which host system 110 informs the TVS server that it is time to provide a nightly maintenance of the database itself, such as for example database 20 in FIG. 1.

The process termination trigger from line 118 by host system 110 informs the TVS server that one of its processors has terminated operation. As was mentioned previously, TVS system 16 comprises a number of processors each mirroring the operation of the others. The system knows which processors should be running at any given time. Thus, should one of the processors terminate its operation, notification is received by the host system that operation at that processor has been terminated so that the host system can instruct the operating system to transfer the process to one of the other backup processors, or to restart the process. Host system 110 is thus an automatic failure recovery system, the process termination trigger informing the system that the process has terminated, at which time the operator of the system needs to determine what type of system error has occurred.

A system operator, designated 120, actually watches over the TVS system to make sure that it is operational. Typical error messages are provided to the operator from the TVS server via line 122. A trigger is provided by the operator to cause the system to perform some function, for example a backup process, if an error is noted, via line 124. The trigger provided to the TVS server may in fact be from the keyboard of the operator.

The TVS server also communicates with other computerized terminals, such as PCs 28, 35 and 34 shown in FIG. 1, represented simply as 28 in FIG. 4. Some of the PCs 28 in actuality connect to the TVS server via mail host 24. Those PCs, for example PC 35 and workstation 36, that gather and retrieve perspective data such as rolled up statistics or CDR flat files, are connected directly to the TVS server. This is indicated by the remote output line 126. Line 128, on the other hand, enables the TVS server to communicate with the remote PCs. Through line 128, the TVS server can validate PC 28 so as to communicate therewith. Data can then be downloaded from PC 28 to the TVS server.

The six major functions performed by the TVS server are discussed with reference to FIG. 5. Mapping feeds process 130 processes feeds from CADB system 38 and COMS system 40. As shown, a country mapping feed, designated 132, is provided by CADB system 38 to map the different country codes. A second input provided to mapping feeds process 130 is the ncode data, via line 102 from COMS system 40. Switch mapping data is also provided by COMS system 40 as an input via line 134. There are two triggers provided to mapping feeds process 130. One of the triggers is from COMS system 40 to indicate that the file from COMS system 40 has arrived. This is indicated by line 104. The other trigger, via line 94, informs mapping feeds process 130 that the file has been provided by CADB system 38. Mapping feeds process 130 then maps the different representations of the switch name and provides that as an operator message, via line 122, to the operator. From this, errors may be generated. Furthermore, the data is provided to a store or a memory entitled state country mapping, designated as 136. Store 136 is a database file in database 20.

Figure 5:
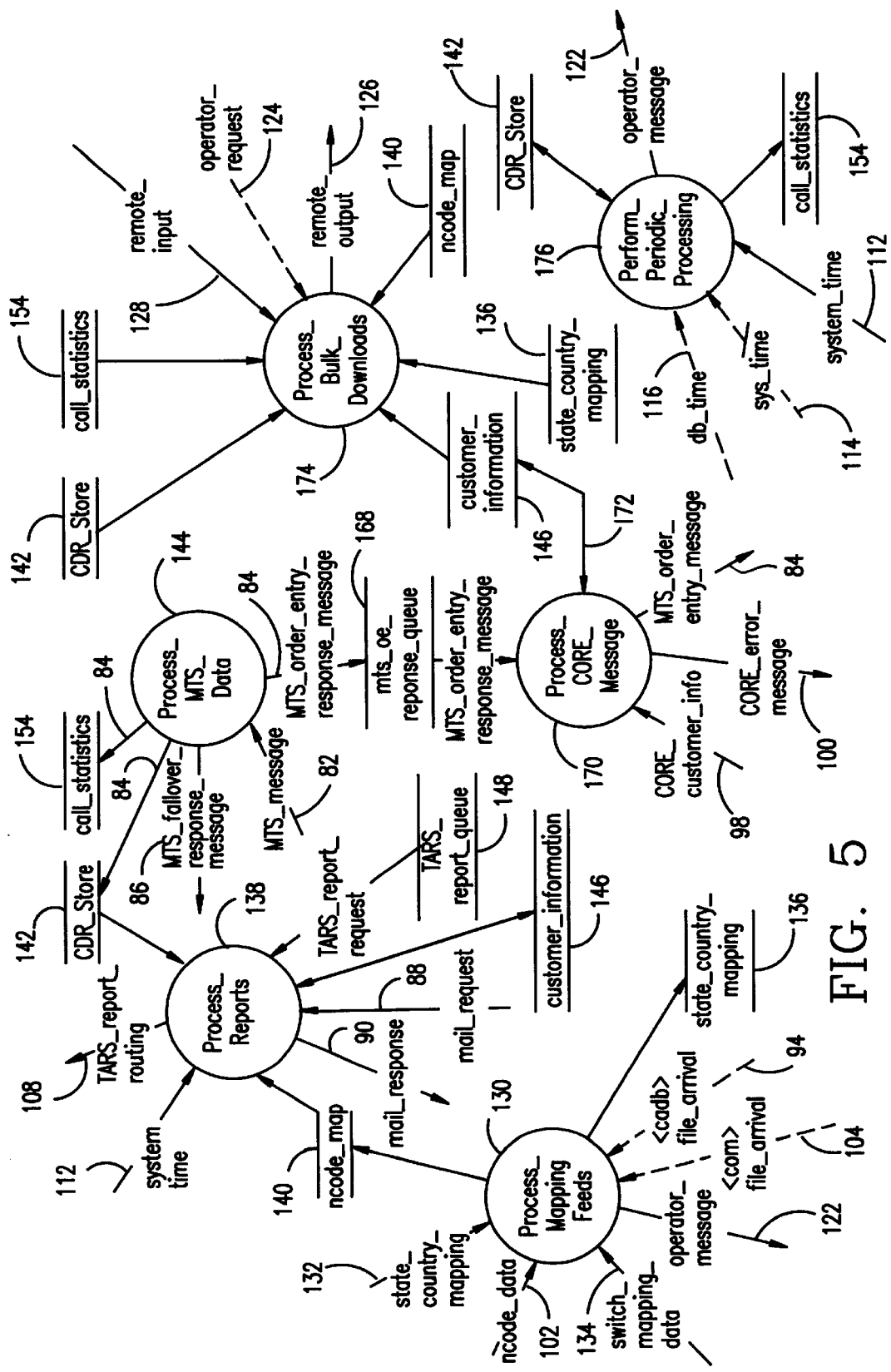
FIG. 5 is a functional diagram illustrating the major functional areas of the TVS system.

The next process that the TVS server performs is the reports process, designated 138 in FIG. 5. As its name implies, process 138 generates, upon request, on a periodic basis, a number of reports. The different functions performed by the reports process 138 will be further elaborated in FIG. 6. For now, it suffices to note that there are a number of inputs, namely a system time provided by host system 110, via line 112, and a mail request provided by CADB system 38, via line 88, to the reports process 138. Also provided from an ncode map store 140 is an ncode map and from a CDR store 142 the requisite CDRs. Ncode map store 140 is a file which stores the different ncode maps as processed by the mapping feeds process 130. CDR store 142 is a file that contains CDRs that were fed thereto by the process performed by MTS system 12, as indicated per MTS data process 144.

Also provided as inputs to reports process 138 are data from a customer information store 146 and a TVS report queue 148. Customer information store 146 provides information about the subscribers, the type of reports that they have ordered, the special service numbers that should be on the report and the frequency that the report should be generated, etc. TVS report queue 148 provides a buffer whereby the requested reports may be processed one at a time. Not shown but should be understood being provided to reports process 138 is a call statistics store which allows process 138 to generate reports directly from call statistics as well as the CDR records retrieved from CDR store 142. When a report is generated, process 138 outputs the report, via line 108, to RDI 106, which interfaces with mail host 24 to forward the report to the subscriber in whichever format requested by the subscriber. Instead of reports, call statistics and CDR records may be retrieved and displayed, as screen formats, for subscribers of RTS system 17 in real time.

Figure 6:
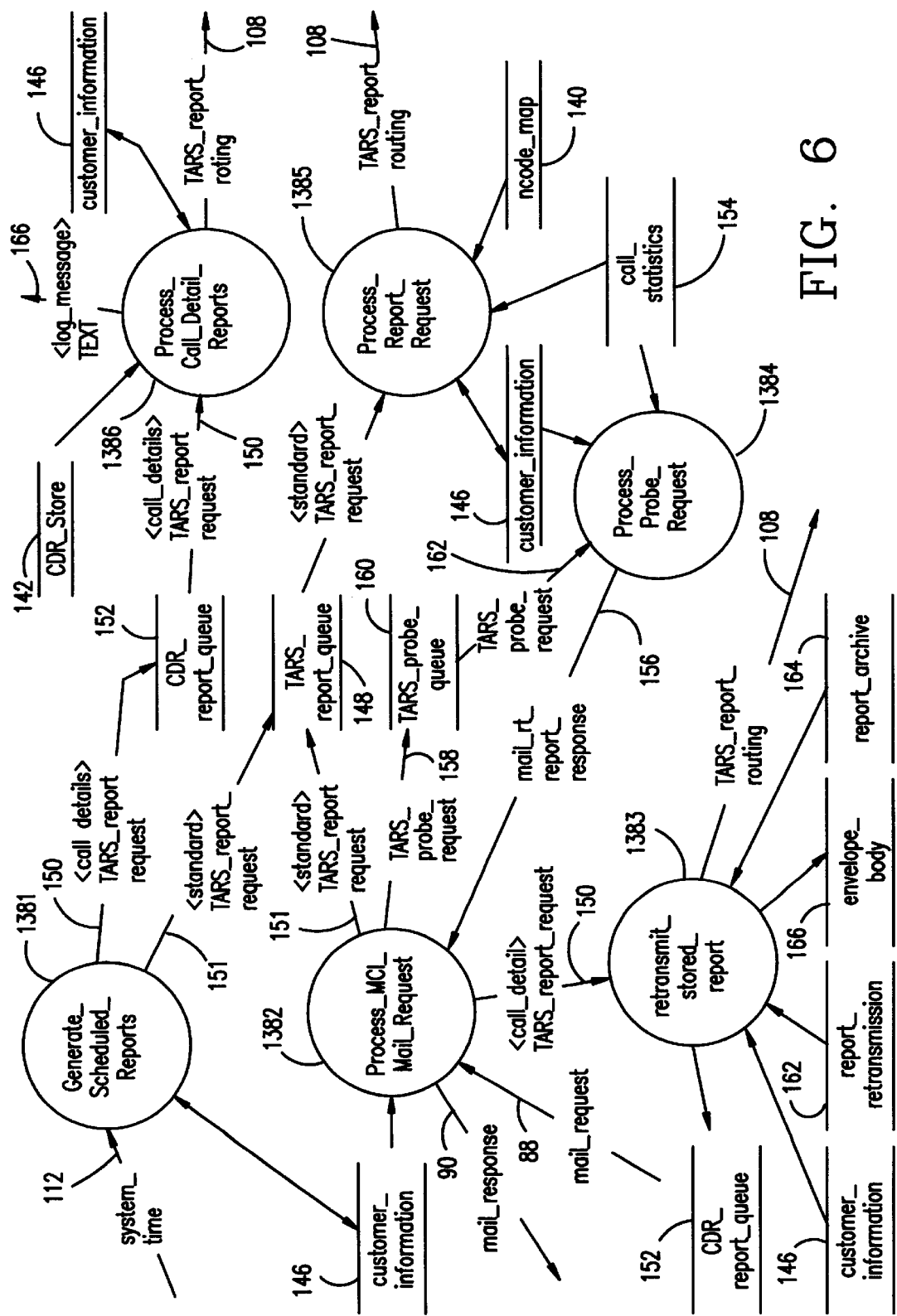
FIG. 6 is a diagram illustrating the various reports being provided by the process report function of the TVS system.

FIG. 6 illustrates the different types of reports processes that are performed in report process 138. As shown, scheduled reports are generated by subprocess 1381. It is by this process that regularly scheduled reports are generated, per input of system time by the host system via line 112. Shown also being provided as an input to the scheduled report generation subprocess 1381 is the information from the subscriber fed from customer information store 146. An output from the scheduled reports subprocess 1381 is the CDR reports which are fed via line 150 to a CDR report queue 152. A standard TVS report request is routed via line 151 to TVS report queue 148.

The next subprocess under report process 138 is the mail request process 1382. In addition to receiving mail request via line 88, note that subprocess 1382 may also receive retransmission requests, discussed earlier. Further shown being provided as an input to mail request subprocess 1382 is the customer information from customer store 146 and a mail report response from a probe request subprocess 1384, via line 156. If there is more than one probe request, the additional requests are provided via line 158 to a TVS probe queue 160, which in turn forwards the queued request via line 162 to probe request subprocess 1384. A standard TVS report request from the mail request subprocess 1382 is fed via line 151 to the TVS report queue 148. A response is then provided by mail request subprocess 1382 to mail host 24 via line 90. Any call detail TVS report request is provided by mail request subprocess 1382 via line 150 to retransmit stored report subprocess 1383.

The stored reports may be sent to the CDR report queue 152, so that the reports are transmitted one at a time, via line 108, to RDI interface 106, and thereby to mail host 24 for delivery to the various subscribers. The report being retransmitted per store report retransmit subprocess 1383 obtains its data from a customer information store 146, a report retransmission store 162 with information pertaining to where the report is to be retransmitted, and a report archive 164 from which a previously prepared report may be retrieved. The format of the report is generated in accordance with the envelope provided by envelope body store 166.

In the probe request subprocess 1384, to send a report response to mail request subprocess 1382, probe request subprocess 1384 retrieves data from the customer information store 146 and call statistics store 154.

In report request subprocess 1385, to perform the report request, subprocess 1385 retrieves the next TVS report request from TVS report queue 148, subscriber data from customer information store 146, call statistics data from call statistics store 154 and ncode map data from ncode map store 140. The generated TVS report is routed via line 108 to RDI interface 106.

The call detail reports subprocess 1386 is the last subprocess of report process 138. For this subprocess, data is retrieved from CDR store 142 and customer information store 146. Upon receipt of the latest TVS report request via line 150 from CDR report queue 152, call detail report subprocess 1386 generates the call detail report and sends it as a text, via line 166, to the host system for logging. In addition, the call detail report generated from subprocess 1386 is routed to RDI interface 106 via line 108, for further transmission to the requesting subscriber.

Return to FIG. 5 and focus to MTS data process 144. Process 144 receives an MTS message from MTS system 12. It is here that data from MTS system 12 is processed to generate the CDRs and call statistics, which are fed via lines 84 to CDR store 142 and call statistics store 154, both residing in MTS system 12. Any MTS fallover response message generated by MTS data process 144 is fed via line 86 to MTS system 12. The MTS order entry response message from MTS data process 144 is loaded to a MTS response queue 168, before the message is fed one at a time to call message process 170.

Call message process 170 retrieves subscriber information from customer information store 146 via line 172 and any additional subscriber information provided by the subscriber via its own computerized terminal, such as for example PC 44 shown in FIG. 1, via line 98. Any CORE error message produced by CORE message process 170 is provided via line 100 to CORE system 42. The MTS order entry message is provided via line 84 to MTS system 12.

Another process performed by the TVS server is the bulk download process 174. Here data is retrieved from CDR store 142, CORE statistics store 154, customer information store 146, state country mapping store 136 and ncode map store 140. All of that information is retrieved in response to the remote input via line 128 from a remote subscriber at a computerized terminal, such as for example PC 35 shown in FIG. 1. Bulk download process 174 begins its operation upon receipt of the trigger from the operator 124. Output from process 174 is provided via line 126 to the remote PC. Note that this bulk download of a statistics file from the TVS server is different from the real time communications process between PC 35 and RTS system 17. For the former, a single file comprising the requested information which spans a given period of time is downloaded. On the other hand, if PC 35 is linked up with RTS system 17, a real time display of the statistics relating to the calls of the subscriber is provided.

One last function performed by the TVS server that is a stand alone function is the perform periodic processing process 176. Process 176 performs predetermined maintenance and housekeeping chores. As inputs, it retrieves data from CDR store 142 and call statistics store 154, as well as system time from host system 110. Upon receipt of the triggers from lines 116 and 114, for example each night, the data retrieved from CDR store 142 and call statistics store 154 are updated and restored in the respective stores. A message is provided to the operator via line 122. System time 114 notifies process 176 to clean up the files of the system, while DB time 116 informs processing 176 to begin the database maintenance operation.

When a subscriber subscribes to the RTS option, he is given a password which enables him to log onto RTS system 17. Once logged on, a subscriber can retrieve various statistics and view in real time those statistics and therefore the operation of the network, at least with respect to his special service call number(s).

Figure 7:
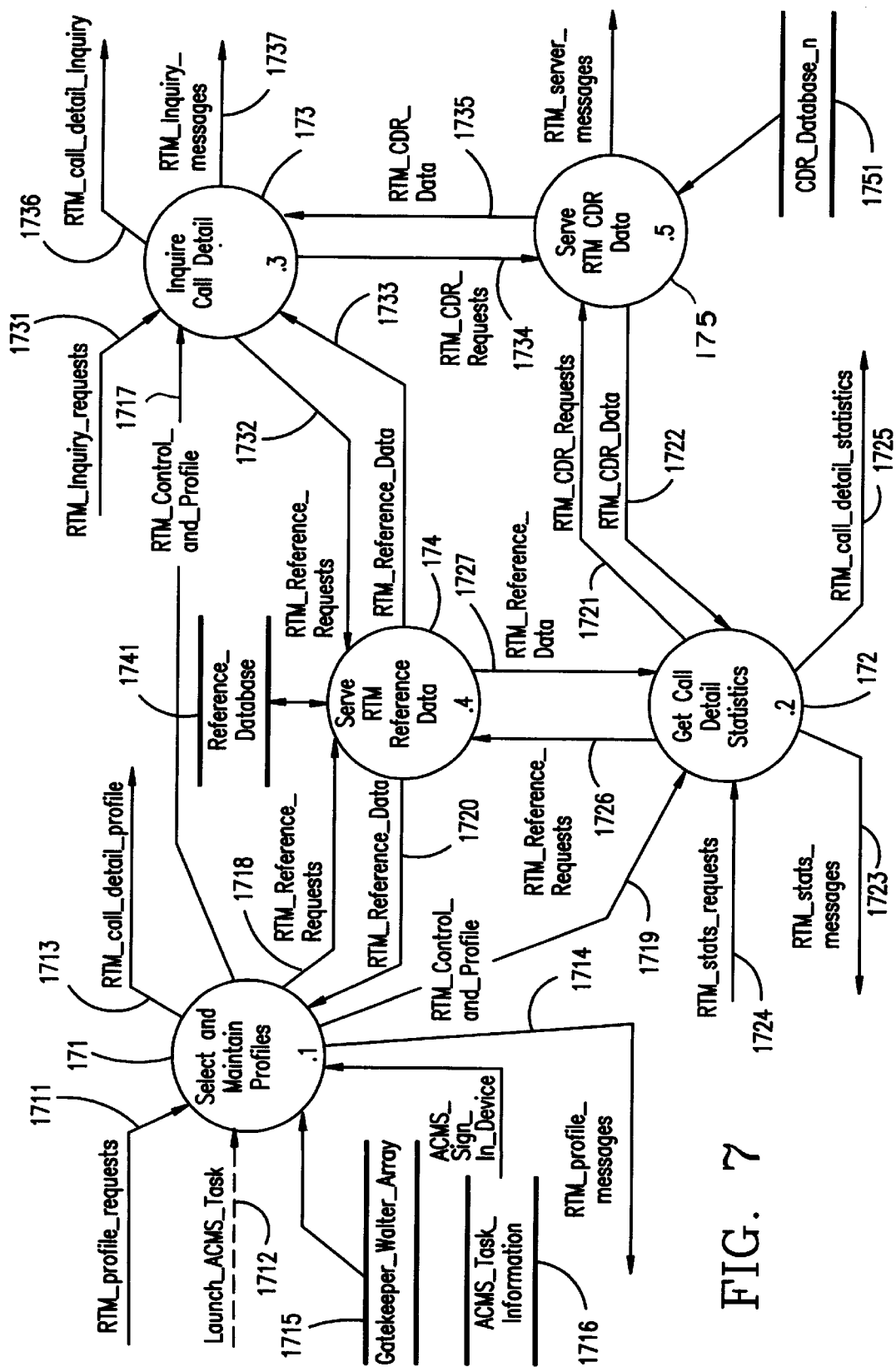
FIG. 7 is a diagram illustrating the major functional processes of the RTS system of the instant invention.

With respect to RTS system 17 and particularly the retrieval of call detail records statistics therefrom by a remote subscriber such as PC 35, refer to FIG. 7. Assume the remote subscriber's computer is equipped with a modem and the I/O ports of RTS system 17 are likewise equipped.

With reference to FIG. 7, the functional processes that take place in RTS system 17, or the real time monitoring (RTM) system, are shown to comprise 5 major functions. They are: select and maintain profiles process 171, get call detail statistics process 172, inquire call detail process 173, serve RTM reference data 174 and serve RTM CDR data 175. A number of inputs and outputs connect the different processes together to provide the operation of RTS system 17. As will be shown later, some of the processes interact with databases of the system.

Shown connected to select and maintain profiles process 171 is a RTM profile request input 1711, a launch ACMS task input 1712, a RTM call detail profile output 1713 and a RTM profile messages output 1714. Also shown to be connected to process 171 are a gatekeeper waiter array store 1715 and an ACMS task information store 1716. In addition, outputting from process 171 are a RTM controller and profile output 1717 to inquire call detail process 173, a RTM reference request output 1718 to serve RTM reference data process 174 and a RTM control and profile output 1719 to get call detail statistics process 172. A RTM reference data line 1720 connects process 171 to serve RTM reference data process 174.

Although not shown, input 1711, as well as outputs 1713 and 1714 are routed to or from a terminal display such as for example PC 35. In other words, RTM profile requests are input to select and maintain profile process 171 via line 1711 while outputs from process 171 are provided as RTM call detail profiles and RTM profile messages to the user's terminal via line 1713 and 1714, respectively. Line 1712 provides to process 171 an application control and management system (ACMS) that acts as an operating environment for the system. Specifically, when a RTM profile request is input to select and maintain profiles process 171, a list of profiles for that subscriber is displayed to the subscriber. This is provided from process 171 to either of outputs 1713 or 1714. When a RTM profile request is made, an ACMS task is launched from line 1712 to create an ACMS environment overlaying the operating system of RTM system 17. The ACMS environment provides the user with specific attributes that facilitate the operation of the system. For example, the environment may limit the system to no more than 50 users in order to be able to keep track of what the various users are doing. It moreover provides coordination for the system in order to enable the system to better handle the various inputs/outputs.

A subscriber or user may dial into the system by means of either mail bulletin board network or be routed directly thereinto by an X.25 protocol. Once an RTM profile request is made by a subscriber, as mentioned before, the system is enveloped by the ACMS environment in response to the particular identifier associated with the RTM request. Specific information such as a particular profile information is retrieved from gatekeeper waiter array store 1715 for responding to an input request. Thus, gatekeeper waiter array store 1715 contains information of the RTM subscribers and allocates a unique identifier for each of the subscribers of the RTS system. Additional data is retrieved by process 171 from an ACMS task information store 1716 for identifying the type of device used by the subscriber so that a particular output format may be provided to the subscriber. The ACMS environment in effect handles or controls the user's sign-in and how they are handled once they are logged on.

Once a subscriber has logged on, his input device having been identified and the profile request received, process 171 may output to the subscriber RTM profile messages via line 1714. These RTM profile messages present the user with a list of the actual profiles that the user has created and stored. In the instance where a user has not stored any profiles, the RTM profile messages presented to the user will request the user to create a new profile. Thus, as its name implies, process 171 enables a subscriber to manage all of his profiles by either adding, deleting or changing any of his profiles.

As shown, RTM reference data is requested by select and maintain profiles process 171 from serve RTM reference data process 174 via line 1718. Upon receipt of a RTM request, process 174 will retrieve from its reference database store 1741 the requested reference data and provide this reference data, which relates to the subscriber who requested the data, to process 171 as RTM reference data via RTM reference data line 1720. As will be discussed later, reference database store 1741 is responsive to both storing and retrieving requests from processes other than process 171. Some of the information that are stored in reference database store 1741 include the order entry information for a particular customer or subscriber, and all of the 800 number information relating to a subscriber such as which 800(s) a subscriber has ordered. Note that the actual 800 call information, in the form of call detail records, are stored in the CDR database store 1751, which will be discussed, infra. Thus, process 174 in essence maintains RTM reference data, by either updating or deleting it, and storing any updated or new RTM reference data into reference database store 1741.

If a subscriber wants to activate a given profile and to monitor the actual CDR records, a RTM control and profile request is sent from process 171 to get call detail statistics process 172. Process 172, upon receipt of the RTM control and profile request, communicates with serve RTM CDR data process 175 by outputting a RTM CDR request via line 1721. Serve RTM CDR data process 175, in response to the RTM CDR request from process 172, retrieves the appropriate data from the appropriate database of CDR database stores 1751. The thus retrieved CDRs stored in CDR database store 1751 for the particular 800 number are counted for the time frame that has been requested. The profile for the particular 800 that a subscriber wants to see is then retrieved by process 175 and routed to process 172 as RTM CDR data by means of line 1722. This retrieved RTM CDR data is next displayed to the subscriber as either RTM statistics messages via line 1723 if a RTM statistics request from line 1724 is received, or as RTM call detail statistics output to line 1725. The call detail statistics are displayed to the subscriber in a substantial real time basis, insofar as the polling interval can be set to vary from one minute to sixty minutes in increments of one minute. In other words, a subscriber, when viewing the call detail statistics, will see continuous changes for every polling time interval.

If a RTM inquiry request is input to RTS system 17 such as from line 1731, given the RTM control and profile provided from process 171 via line 1717, the inquiry call detail process 173 will request the RTM reference data from service RTM reference data process 174 via line 1732. The relevant reference data is retrieved from reference database store 1741 and provided by process 174 as RTM reference data to inquire call detail process 173 via line 1733. Given the RTM reference data and the appropriate RTM control and profile, process 173 sends a RTM CDR request to service RTM CDR data process 175 via line 1734. Process 175, upon receipt of the RTM CDR request, similar to its response to such request from process 172, retrieves from CDR database store 1751 the CDR statistics for the particular profile and routes this as RTM CDR data to process 173 via line 1735. Process 173, upon receipt of the RTM CDR data, displays it as a call detail screen to the subscriber. This output is provided as either a RTM call detail inquiry screen to the subscriber via line 1736 or as RTM inquiry messages via line 1737.

For RTS system 17, therefore, different outputs may be provided to a subscriber, depending on what the subscriber requests. If the subscriber requests call details, then a call detail statistics screen is provided by process 173 to the subscriber. On the other hand, if the subscriber wants to monitor the real time operation of the network, he will request such and get call detail statistics process 172 will provide call detail statistics screen to the subscriber. By observing the various screens, a subscriber can therefore monitor whether any trend has occurred with the operation of the network. If there is, appropriate actions may be taken to rectify the problem or alter the trend.

As was mentioned previously, the call detail records are stored in CDR database store 1751. The reason that there are multiple CDR database stores is that each subscriber, irrespective of however many special service call numbers that he subscribes to, is assigned a specific CDR database. This is found to enhance the adding or changing of the special service call numbers, and the detail information for each of those numbers. These database stores are the same as the above mentioned relational databases disclosed in the aforenoted co-pending '186 application.

For RTS system 17, in operation, when a subscriber or user has selected a specific profile, that profile is initially associated with an inquire call detail or get call detail statistics. Either the get call detail statistics or the inquire call detail may be viewed by the subscriber at one time by either requesting from process 172 or 173, respectively. Thus, if a subscriber activates or selects a specific profile, that profile (or rather the designation or name associated with that profile) and a few other pieces of information are routed to get call detail statistics process 172. Process 172, upon receipt of the request, sends a RTM reference request to serve RTM reference data process 174, which retrieves the RTM reference for that profile from reference database 1741. The RTM reference request from process 172 is sent to process 174 via line 1726. Once retrieved, the RTM reference data is sent by process 174 to process 172 via line 1727. Now that process 172 has all of the reference information, it sends a RTM CDR request to serve RTM CDR data process 175 requesting RTM CDR statistics. Process 175, upon receipt of the request from process 172, retrieves the appropriate information from CDR database store 1751 and transmits that RTM CDR data via line 1722 to process 172 to be displayed for the user.

On the other hand, if the subscriber selects a profile that is initially associated with inquire call detail process 173, the exact same thing as mentioned before occurs. In other words, process 173 will request the requisite RTM reference from process 174. Upon retrieval of the appropriate reference data from reference database store 1741, process 174 transmits that RTM reference data to process 173. Thereafter, process 173 sends the RTM CDR request to process 175. The appropriate RTM CDR data is retrieved from the appropriate CDR database store 1751 and transmitted to process 173. This retrieved RTM CDR data is then displayed to the subscriber.

Figure 8:
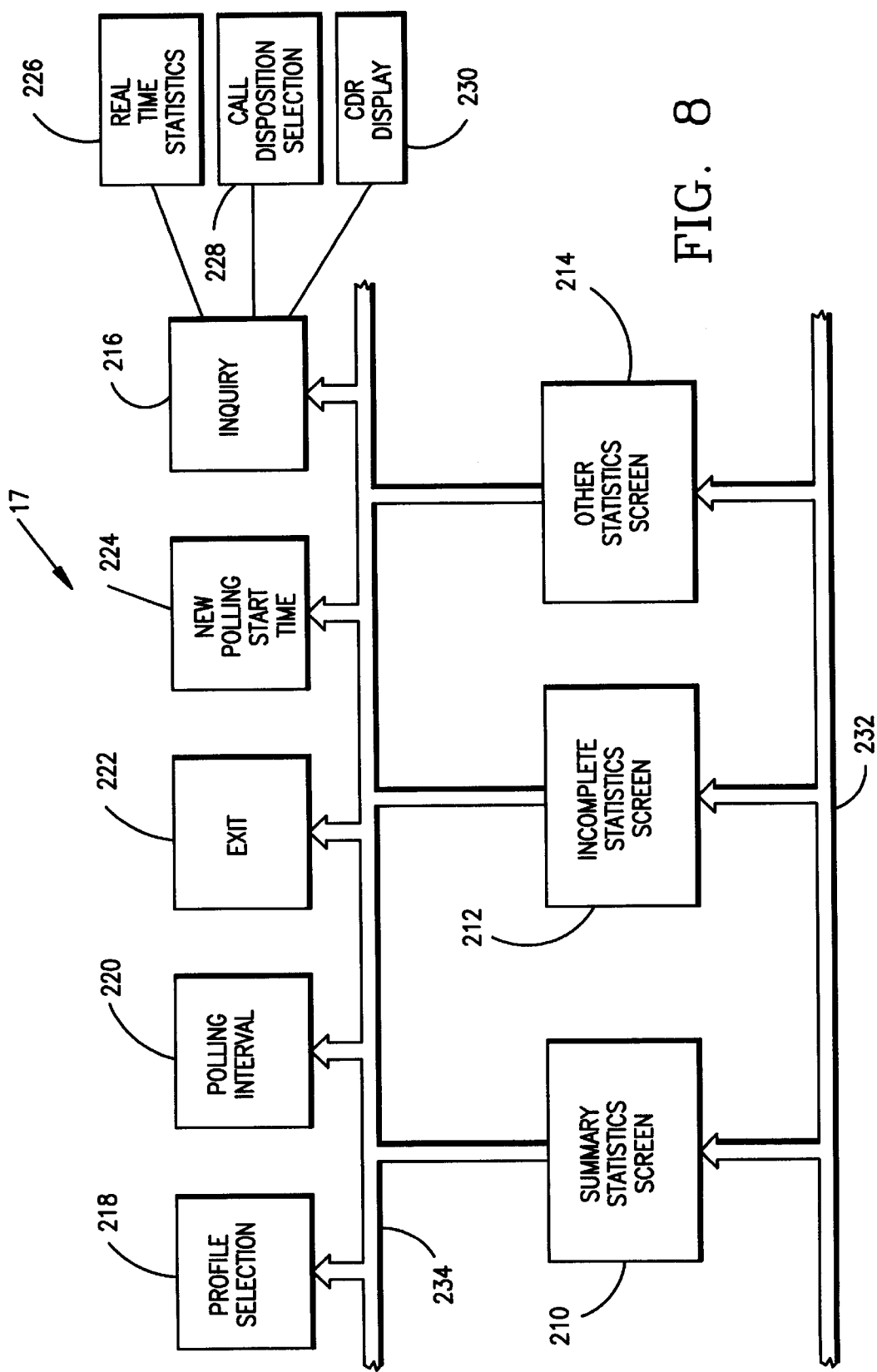
FIG. 8 is a diagram showing the interrelationship between the various screens of the RTS system.

There are a number of screens displayed by RTS system 17 that, in combination, provide the subscriber with the statistics he desires. As shown in FIG. 8, these various screens are interrelated and, as will be shown later, are selectable by the subscriber. In particular, there is a summary statistics screen 210, an incomplete statistics screen 212, an other statistics screen 214, an inquiry screen 216, a profile selection screen 218, a polling interval screen 220, an exit screen 222 and a new polling start time screen 224. There are furthermore a real time statistics subscreen 226, a call disposition subscreen 228 and a CDR display screen 230 emanating from inquiry screen 216.

To illustrate the interrelationship between the screens, note that summary statistics screen 210, incomplete statistics screen 212 and other statistics screen 214 are interrelated, by a bus 232. At the same time, those screens are also interrelated, per another bus 234, to profile selection screen 218, polling interval screen 220, exit screen 222, new polling start time screen 224 and inquiry screen 216. These screens, or subscreens (pop-up screens), are provided to the subscriber via the display on his computer. The only software that the subscriber requires is a conventional communications software such as for example Procomm Plus. The only requirement is that the subscriber's computer system is equipped with a VT100-compliant display, otherwise known as an ANSI-compliant terminal emulation package.

RTS system 17 basically provides a subscriber the ability to see in near real time how the network is performing. The subscriber can see how many calls (directed to his call number(s)) are being attempted on a predetermined time period, as for example minute by minute. The subscriber furthermore can see how many of those calls are being allowed through the network, how many are incompletes, how many are blocked, etc. Furthermore, RTS system 17 provides subscribers the ability, if they decide to do so, to look up specific call records that made up a specific type of call. For example, if a subscriber sees an abnormal number of incompletes, assuming that ordinarily 5% of calls are incompletes, he can retrieve the call records that made up those incomplete calls to find out why those calls were incompletes. A screen for showing the various statistics is shown in FIG. 16.

The screen of FIG. 16 shows both current and total number of calls to a subscriber. This exemplar FIG. 16 screen shows that a subscriber started viewing in near real time the statistics of calls directed to his call numbers at 00:43, and that the current time is 19:38. The polling time interval is five minutes. Thus, the next screen that the subscriber sees will be at 19:43. As further shown in the exemplar screen of FIG. 16, the subscriber "DANTEST" has two special service call numbers, i.e. 123-4567 and 345-8789. It is assumed for this discussion that those numbers are 800 numbers. Both the current (C) and total (T) figures are shown. Thus, during the time period that the subscriber views the summary statistics screen, there were three attempts that were incompletes; and those incomplete calls were directed to call number 123-4567. Given the five minute interval, the next screen that the subscriber sees will be a screen that shows what occurred between 19:38 and 19:43.

Note that even though only two special service call numbers are shown, a subscriber can in actuality subscribe to a much greater number of special service call numbers. Note further that in addition to showing the number of attempts and incompletes, the FIG. 16 screen also shows "OTHER" which may be calls that were blocked or didn't get through because of the insufficient capacity in the network purchased by the subscriber, and "DTO" which is direct termination overflow that shows how many of the calls are rerouted when the network capacity for a specific route is either busy or over capacity. The DTO feature may be ordered by the subscriber. There is also a "DURATION" portion which shows the average and total durations, both in minutes and seconds.

At the bottom of the FIG. 16 screen, there are a number of options provided to the subscriber for exiting the exemplar screen of FIG. 16 and going to some other screen. For example, given that there are three incompletes shown on the summary statistics screen of FIG. 16, a subscriber may want to next view the incompletes statistics summary screen of FIG. 17.

Upon activation, incomplete statistics screen 212 shows retrieved call detail records of the special service call numbers associated with the subscriber on the exemplar screen of FIG. 17. As before, a total of three incompletes are shown. These incompletes are further categorized as "short calls", which are calls that last less than three seconds. In other words, incomplete calls are in all likelihood calls directed to call number 123-4567 while that number was busy. The other two categories further elaborating incomplete calls are "didn't wait" and "didn't answer". A "didn't wait" call is chosen to be from 3–15 seconds which means that the phone rang for a while before the customer hung-up. A "didn't answer" incomplete call is one that lasts more than 15 seconds and means that there was probably no operator available to answer that incoming call. When a large number of blocks are shown in the incomplete summary screen of FIG. 17, the subscriber can next proceed to the other summary screen of FIG. 18 to determine the reason why a call is blocked.

As shown in FIG. 18, one of the reasons that a call is blocked is due to its ID codes. This is also known as subcode blocking and it is a type of call that a subscriber has configured. For example, a subscriber may require that a PIN (personal identification number) be required before a call is to be completed. Thus, an ID code blocked call is a blockage defined by the subscriber. The next type of blockage is a "tailor call coverage", also known as an out of band blockage. This is where a subscriber has purchased a special service call number such as a 800 number for only a given area in the country. For example assume a subscriber has subscribed to a 800 number only in the state of New Jersey. Anyone calling from outside that state is considered out of band and not in the "tailor call coverage".

There is also an "equipment/network congestion" blockage. These are blocks defined by the management of the telecommunications network. For example, a switch may be congested, a line has failed, etc.

To determine where the incomplete calls are coming from, a subscriber can go to a call detail inquiry screen such as that shown in FIG. 19. The exemplar screen of FIG. 19 provides a list of all of the calls made to a particular special service number at a particular time range specified by the subscriber. It provides details about the call so that the subscriber can find out where the incomplete calls came from. An advantage provided by this screen is that the subscriber may call his customers back to find out additional information than what is displayed. FIG. 19 further shows that the time range requested by the subscriber is between 00:00 to 23:59, i.e. substantially the whole day. The call detail inquiry pertains to an 800 number, namely 123-4567. The calling number from which the incomplete call originated is (719)282-1860. The country code of one designates the United States. The time it was connected to the network is shown to be Aug. 31, 1994 at 04:00 hour. The duration of the call was 12 seconds. The disposition of the call was that there was no answer. The DNIS designates a specific termination from a customer PBX, which is shown to be 123-3589. There is no DTO.

There are a number of call dispositions that are available to a subscriber. One of those is shown in FIG. 19. To select another call disposition or multiple call dispositions, the subscriber can select a call disposition selection screen such as that shown in FIG. 20. For the instant invention, there are 10 available call dispositions that a call can have. These include: answered, short call, didn't wait, didn't answer, ID codes, tailor call coverage, NCS reject, NCS blocked, switch control and network block. A subscriber can asterisk or highlight any one, a multiple or all of the call dispositions, for viewing. In other words, a subscriber selects the criteria for what is to be displayed on the screen. For the example shown in FIG. 20, a subscriber has chosen answer (completed calls), short calls, didn't wait, didn't answer, tailor call coverage, NCS reject and switch control calls. By selecting the different call dispositions, a subscriber sees different information relating to the calls.

One of such detailed displays is shown in the CDR detail display of FIG. 21. A pop-up screen thereat shows that the call was made from Colorado Springs, Colo. and that it was a short call. Additional information relating to each of the call dispositions may be added as seen fit.

So far, discussion has been had with the various screens which a subscriber can view with respect to calls directed to one or more of his special service call numbers. But before a subscriber can view the various screens, he needs to sign up with the TVS system 16, and more particularly subscribe to the RTS option.

When a subscriber first signs up with the network, a profile is established for him. Such profile selection screen is shown in FIG. 9. The subscriber can have as many profiles as he desires. Putting it differently, he may have one for monitoring all of his 800 numbers, one that monitors only one specific 800 number, one that monitors only five of his 800 numbers, etc. By inputting to the profile selection screen, a subscriber can select a given profile that he wants to use which defines the numbers that will be shown. In addition, the type of statistics look-up, or call inquires, that the subscriber wants may also be selected. New profiles may be created, while existing profiles can be updated.

FIG. 10 illustrates a screen by which a subscriber can add a profile. Suppose the subscriber has logged onto the system. He is prompted for his profile name which is shown by the exemplar FIG. 10 to be "testuser". The screen shows to the subscriber the polling interval, which for this example is five minutes. A description of the profile may also be provided. For example, the exemplar FIG. 10 profile screen shows that it is a test profile. So, too, a list of all of the special service numbers, for example 800 numbers, for the subscriber is shown. Selective 800 numbers shown on the screen of FIG. 10 can be monitored in greater details. See for example the four asterisked numbers of FIG. 10. To delete the display, the asterisk next to the number can be removed by simply toggling the number once the number has been highlighted with a cursor.

A profile may be deleted as shown in FIG. 11. Specifically, after the profile selection screen of FIG. 9 is retrieved, a key, for example CTRL-D is selected so that a pop-up screen appears. By moving the cursor, a particular profile would be deleted. As shown in FIG. 11, given that the subscriber has five different profiles, if he were to delete the profile "DANTEST", four other profiles remain.

To add a special call number, the exemplar screen shown in FIG. 12 is used. The add/delete profile phone numbers pop-screen is retrieved after the subscriber has entered into the adding a profile screen of FIG. 10. In addition to adding, special service phone numbers may also be deleted. If the number of special service call numbers exceeds the capacity of the screen, a subscriber can roll the screen to view the numbers outside of the view of FIG. 12.

A so-called top five numbers may be selected. This is shown in FIG. 13. The specific details and statistics relating to those numbers, once selected, are displayed on the statistics screens. Although only five numbers are shown to be selectable in FIG. 13, a higher or smaller number may also be selected. Once selected, those numbers are continuously displayed on the screen.

The polling interval may be changed. For example, the discussion so far pertains to a polling interval of 5 minutes. However, such polling period may be changed to 10 minutes, as shown in FIG. 14, or to a smaller predetermined period of time.

The start time for the polling interval likewise can be changed. This is shown in FIG. 15 in which the start time has been changed to 19:40.

By thus being able to monitor in substantially real time the operation of the network with respect to calls directed to call numbers the subscriber has subscribed to, a subscriber can quickly identify how efficiently his 800 numbers are being utilized. For example, suppose between 9:00 am and 10:00 am, an average of 100 calls per minute were received. Further assume that there were 200 operators on duty for the subscriber. Accordingly, half of those operators were not busy during that time period. On the other hand, between 3:00 pm and 4:00 pm there were only 50 operators on duty. Yet there were, on average, 400 calls per minute received during that period of time, resulting in a large number of incomplete calls. Once having that information, the subscriber can reallocate his resources, for example decreasing the number of operators in the morning and increasing the active operators in the afternoon. If it is found that there is a lot of blockage occurring, the subscriber can purchase additional capacity from the network.

Figure 22:
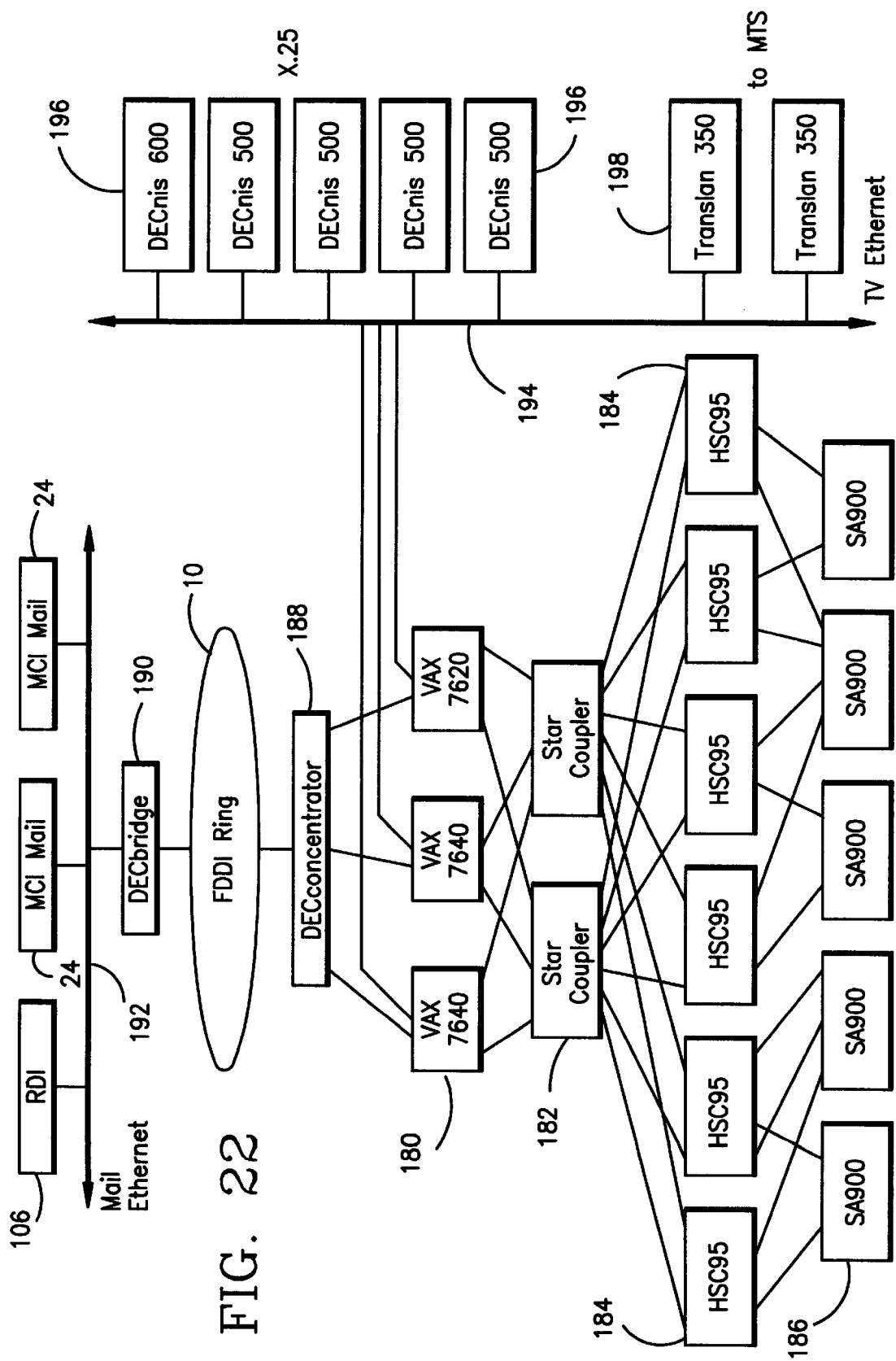
FIG. 22 shows the hardware components of a first embodiment of the TVS system of the present invention.

FIG. 22 illustrates a first embodiment of the hardware components that made up TVS system 16 of the present invention. In particular, the TVS system comprises three VAX 7640 processors 180 from the Digital Equipment Corporation. These processors are coupled by two star couplers 182 to a number of disk controllers HSC95, designated 184. Star couplers 182 provide interfacing between processors 180 and storage controllers 184, which are hierarchial storage controllers made by the Digital Equipment Corporation. Controllers 84 are in turn connected to a plurality of disk storage 186, such as the SA900 disk storage system made by the Digital Equipment Corporation. The outputs of each of the processors 180 is provided to a concentrator 188, which concentrates the respective outputs as a single output to FDDI ring 10. Concentrator 188 is made by the Digital Equipment Corporation. The output from FDDI ring 10 is provided to a bridge 190, also made by the Digital Equipment Corporation, which converts the fiber output from the TVS system into an output that is capable of being put onto the Ethernet line 192. The output is then provided to RDI 106 or mail host 24 for transmission to the different subscribers of the service.

Processors 180 are moreover connected to a "TRAFFIC-VIEW" Ethernet line 194. Connected to Ethernet line 194 are a plurality of network information servers 196. These information servers are conventional products made by the Digital Equipment Corporation under model number DECnis 600 and 500. Basically, servers 196 provide connectivity between an X.25 network and the Ethernet line 194.

Also connected to Ethernet line 194 are two translans 198 which connect TVS system 16 to MTS system 12. Translans 198 are also made by the Digital Equipment Corporation. Thus, for the telecommunications network of FIG. 1, the MTS system may be located remotely from the TVS system. For the FIG. 22 embodiment, all of the lines are bidirectional lines, which enable bidirectional exchange of data between the TVS system and the other systems in the telecommunications network of FIG. 1.

Figure 23:
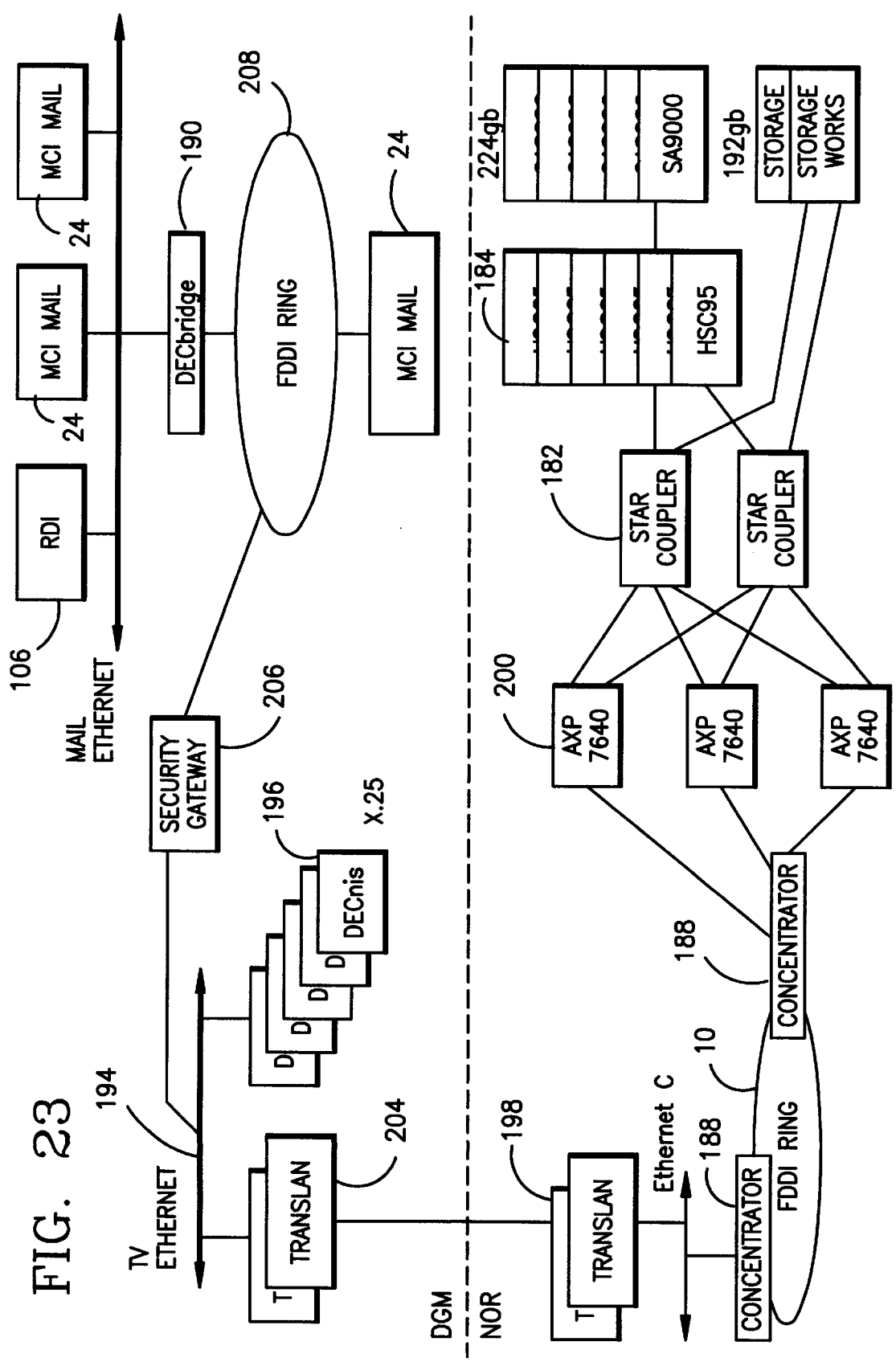
FIG. 23 is a schematic illustrating the different hardware components of a second embodiment of the TVS system of the present invention.

FIG. 23 illustrates a second embodiment of different hardware components of TVS system 16 of the instant invention. But for the type of processor used and the additional storage capacity, the FIG. 23 embodiment mirrors that of FIG. 22. In particular, in place of the VAX 7640 processors, designated 180 in FIG. 22, the processors of the TVS system of FIG. 23 are Alpha AXP7640 processors 200 made by the Digital Equipment Corporation. In addition to the change of processors, the TVS system of FIG. 23 also has increased storage capacity, as indicated by the storage works 202. The TVS system is stored in a first location named NOR and communicates with the MTS system located at DGM, via respective translans 198 and 204. Another difference between the FIG. 23 embodiment and the FIG. 22 embodiment is the security gateway 206 provided between Ethernet line 194 and a FDDI ring 208. Basically, security gateway 206 prevents unauthorized access to the system.

Inasmuch as the present invention is subject to many variations, modifications and changes in detail, it is intended that all matter described throughout this specification and shown in the accompanying drawings be interpreted as illustrative only and not a limiting sense. Accordingly, it is intended that the invention be limited only by the spirit and scope of the appended claims.

We claim:

1. System for subscribers of a telecommunications network to monitor in substantially real time the operation of said network, comprising:

processor means for determining the call details of special service calls routed through said network;

a traffic statistics apparatus including database means into which records of the call details determined from calls of various subscribers routed through said network are stored;

computer means provided to each of said various subscribers; and transceiver means adapted to the computer means of said each subscriber for communicating with said traffic statistics apparatus;

said computer means displaying to said each subscriber the operation of said network as it relates to any special service number of said each subscriber in substantial real time once said computer means is communicatively connected to said traffic statistics apparatus via said transceiver means.

2. System of claim 1, wherein the operation of said network being displayed by said computer means to said each subscriber comprises traffic statistics relating calls directed to said any special service number of said each subscriber.

3. System of claim 1, further comprising:

terminal means for enabling instructions to be input to said processor means for creating a profile for said each subscriber so that the operation of said network is displayed to said each subscriber in accordance with said input profile.

4. System of claim 1, wherein said transceiver means comprises a modem; and wherein said computer means comprises a computer.

5. System of claim 1, wherein the operation of said network is displayed to said each subscriber as multiple screens each linked to other screens each having a number of options that said each subscriber can choose.

6. System of claim 1, wherein the operation of said network being displayed by said computer means to said each subscriber comprises a summary statistics screen, an incomplete statistics screen, an other statistics screen and an inquiry screen that displays real time statistics and call detail records of calls directed to said any special service number of said each subscriber.

7. Apparatus for enabling a subscriber of a telecommunications service provider to monitor the traffic of calls to at least one special service call number of said subscriber through the communications network of said telecommunications service provider, comprising:

processor means for generating call detail records of special service calls routed through said network;

database means for storing the call detail records of said calls;

transceiver means for enabling said subscriber to communicatively interface with said database means to retrieve data relating to stored call detail records of calls directed to any special service call number subscribed by said subscriber, said data being displayed to said subscriber as various data screens each representative of the status of said calls being routed through said network and responsive to a particular request by said subscriber.

8. Apparatus of claim 7, further comprising:

input means for entering instructions to said processor means for creating a profile for said subscriber;

display means for displaying to said subscriber said data in accordance with said profile of said subscriber.

9. Apparatus of claim 7, wherein said data being displayed to said subscriber comprises traffic statistics relating to calls directed to said any special service call number of said subscriber.

10. Apparatus of claim 7, wherein said transceiver means comprises a modem; and wherein said subscriber communicatively interfaces with said database means with a computer equipped with a modem.

11. Apparatus of claim 7, wherein said data is displayed to said subscriber as multiple screens each linked to other screens each having a number of options that said subscriber can choose.

12. Apparatus of claim 7, wherein said various data screens comprise a summary statistics screen, an incomplete statistics screen, an other statistics screen and an inquiry screen that displays real time statistics and call detail records of calls directed to said any special service call number of said subscriber.

13. In a telecommunications network a method for subscribers to monitor in substantially real time the operation of said network, comprising the steps of:

retrieving and determining the call details of special service calls routed through said network;

storing into a database means of a traffic statistics apparatus records of the call details determined from calls of various subscribers routed through said network;

providing computer means to each of said various subscribers;

adapting transceiver means to the computer means of said each subscriber for communicating with said traffic statistics apparatus; and displaying to said each subscriber, via his computer means, the operation of said network as it relates to any special service number of said each subscriber in substantial real time once said computer means is communicatively connected to said traffic statistics apparatus via said transceiver means.

14. Method of claim 13, wherein said displaying step further comprises the step of displaying to said each subscriber traffic statistics relating to said any special service call of said each subscriber.

15. Method of claim 13, further comprising the step of:

inputting instructions to said processor means for creating a profile for said each subscriber so that the operation of said network is displayed to said each subscriber in accordance with said input profile.

16. Method of claim 13, wherein said displaying step further comprises the step of displaying the operation of said network to said each subscriber as multiple screens each linked to other screens each having a number of options that said each subscriber can choose.

17. Method of claim 13, wherein said displaying step further comprises the step of:

displaying the operation of said network to said each subscriber as any of a summary statistics screen, an incomplete statistics screen, an other statistics screen and an inquiry screen that displays real time statistics and call detail records of any special service call for said subscriber.

18. A method of enabling a subscriber of a telecommunications service provider to monitor the traffic of calls to at least one special service call number of said subscriber through the communications network of said telecommunications service provider, comprising the steps of:

using a processor means to generate call detail records of special service calls routed through said network;

storing the call detail records of said calls in a database means;

said subscriber communicatively interfacing with said database means via a transceiver means to retrieve data relating to stored call detail records of calls directed to any special service call number subscribed by said subscriber; and displaying said retrieved data to said subscriber as various data screens each representative of the status of said calls being routed through said network and responsive to a particular request by said subscriber.

19. Method of claim 18, further comprising the steps of:

inputting instructions to said processor means for creating a profile for said subscriber; and wherein said displaying step further comprises the step of displaying to said subscriber said data in accordance with said profile of said subscriber.

20. Method of claim 18, wherein said displaying step further comprises the step of:

displaying said retrieved data to said subscriber as traffic statistics relating to calls directed to said any special service call number of said subscriber.

21. Method of claim 18, wherein said displaying step further comprises the step of:

displaying said retrieved data to said subscriber as multiple screens each linked to other screens each having a number of options that said subscriber can choose.

22. Method of claim 21, wherein said displaying step further comprises the step of:

displaying said various data screens as any of a summary statistics screen, an incomplete statistics screen, an other statistics screen and an inquiry screen that displays real time statistics and call detail records of any special service call for said subscriber.

23. A method of displaying to a subscriber of a telecommunications service provider data relating to the traffic of calls to at least one special service call number of said subscriber through the communications network of said telecommunications service provider, comprising the steps of:

establishing at least one call detail profile for said one special service call number;

storing reference data relating to said one profile in a reference database store;

ascertaining the type of traffic data requested by said subscriber;

depending on the type of data requested by said subscriber, sending either a statistics request to retrieve call detail statistics data or an inquiry request to retrieve call detail data (CDR) from a CDR database store; and displaying either of said retrieved data to said subscriber.

24. Method of claim 23, further comprising the step of:

displaying said retrieved call detail statistics data to said subscriber as various data screens each representative of the status of calls being routed through said network and responsive to a particular request by said subscriber.

25. Method of claim 23, further comprising the step of:

retrieving reference data associated with any call detail statistics data request or any CDR request from said reference database store;

using said retrieved reference data associated with said any request to retrieve the appropriate data from said CDR database store.

\* \* \* \* \*